United States Patent
Li et al.

(10) Patent No.: US 11,561,390 B2
(45) Date of Patent: Jan. 24, 2023

(54) ULTRASOUND LENS STRUCTURE CLEANER ARCHITECTURE AND METHOD USING STANDING AND TRAVELING WAVES

(71) Applicant: Texas Instruments Incorporated, Dallas, TX (US)

(72) Inventors: Yunhong Li, Santa Clara, CA (US); David Patrick Magee, Allen, TX (US); Stephen John Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 109 days.

(21) Appl. No.: 17/064,645

(22) Filed: Oct. 7, 2020

(65) Prior Publication Data

US 2021/0018748 A1 Jan. 21, 2021

Related U.S. Application Data

(63) Continuation of application No. 15/395,665, filed on Dec. 30, 2016, now Pat. No. 10,838,199.

(51) Int. Cl.
*G02B 27/00* (2006.01)
*B08B 7/02* (2006.01)
*B60S 1/56* (2006.01)
*B60R 11/04* (2006.01)

(52) U.S. Cl.
CPC .......... *G02B 27/0006* (2013.01); *B08B 7/028* (2013.01); *B60S 1/56* (2013.01); *B60R 11/04* (2013.01)

(58) Field of Classification Search
CPC ............ G02B 27/0006; G02B 27/0012; G02B 27/00; B08B 7/028; B08B 7/02; B08B 7/00; B08B 6/00; B60S 1/56; B60R 11/04
USPC ........................................................ 359/508
See application file for complete search history.

(56) References Cited

U.S. PATENT DOCUMENTS

| | | |
|---|---|---|
| 3,520,724 A | 7/1970 | Messa |
| 3,643,135 A | 2/1972 | Devore et al. |
| 3,681,626 A | 8/1972 | Puskas |
| 4,019,073 A | 4/1977 | Vishnevsky et al. |
| 4,271,371 A | 6/1981 | Furuichi et al. |

(Continued)

FOREIGN PATENT DOCUMENTS

| | | |
|---|---|---|
| CN | 104709241 A | 6/2015 |
| JP | 0011260781 A | 9/1999 |

(Continued)

OTHER PUBLICATIONS

Graff, "Wave Motion in Elastic Solids", Dover, 1991, 3 pgs.

(Continued)

*Primary Examiner* — Jade R Chwasz
(74) *Attorney, Agent, or Firm* — Krista Y. Chan; Frank D. Cimino

(57) ABSTRACT

A lens structure system with a lens structure and a multi-segmented transducer coupled to the lens structure. Each segment in the plurality of segments has a first conductor and a second conductor, wherein the first conductor and the second conductor are electrically coupled to the segment. The system also has circuitry for applying a voltage to selected segments in the plurality of segments with standing wave signals and traveling wave signals.

19 Claims, 13 Drawing Sheets

(56) References Cited

U.S. PATENT DOCUMENTS

| | | | |
|---|---|---|---|
| 4,510,411 | A | 4/1985 | Hakamata et al. |
| 4,607,652 | A | 8/1986 | Yung |
| 5,173,631 | A | 12/1992 | Suganuma |
| 6,078,438 | A | 6/2000 | Shibata et al. |
| 7,486,326 | B2 | 2/2009 | Ito |
| 7,492,408 | B2 | 2/2009 | Ito |
| 7,705,517 | B1 | 4/2010 | Koen et al. |
| 8,293,026 | B1 | 10/2012 | Bodor et al. |
| 8,385,733 | B2 | 2/2013 | Nomura |
| 9,228,183 | B2 | 1/2016 | Lipkens et al. |
| 10,606,069 | B2 | 3/2020 | Fedigan |
| 10,838,199 | B2 * | 11/2020 | Li ................. G02B 27/0006 |
| 2003/0214588 | A1 | 11/2003 | Takizawa et al. |
| 2004/0012714 | A1 | 1/2004 | Kawai |
| 2004/0047625 | A1 | 3/2004 | Ito et al. |
| 2004/0134514 | A1 | 7/2004 | Wu et al. |
| 2005/0280712 | A1 | 12/2005 | Kawai |
| 2008/0166113 | A1 | 7/2008 | Yasuda et al. |
| 2008/0247059 | A1 | 10/2008 | Dong |
| 2009/0011243 | A1 | 1/2009 | Yamada et al. |
| 2010/0158501 | A1 | 6/2010 | Kawai |
| 2010/0165187 | A1 | 7/2010 | Miyazawa |
| 2010/0171872 | A1 | 7/2010 | Okano |
| 2011/0228389 | A1 | 9/2011 | Ohashi |
| 2012/0243093 | A1 | 9/2012 | Tonar et al. |
| 2017/0048061 | A1 | 2/2017 | Bohdan et al. |

FOREIGN PATENT DOCUMENTS

| | | |
|---|---|---|
| JP | 2007193126 A1 | 8/2007 |
| JP | 2010181584 A | 8/2010 |
| RU | 2393644 C1 | 6/2010 |

OTHER PUBLICATIONS

Hagedorn et al., "Travelling Wave Ultrasonic Motors, Part I: Working Principle and Mathematical Modelling of the Stator", Journal of Sound and Vibration, 1992, 155(1), pp. 31-46.

Fedigan, et al. "Ultrasound Lens Structure Cleaner Architecture and Method," U.S. Appl. No. 15/225,212, filed Aug. 1, 2016 (41 pages).

Li, et al., "Ultrasonic Lens Cleaning with Travelling Wave Excitation," U.S. Appl. No. 15/186,944, filed Jun. 20, 2016 (31 pages).

International Search Report and Written Opinion dated on Sep. 7, 2017, Application No. PCT/US2017/038348, 8 pages.

International Search Report and Written Opinion dated Nov. 2, 2017, Application No. PCT/US2017/044807, 8 pages.

European Search Report for EU Application 17837503.6 dated Jul. 18, 2019.

PRC Patent Application No. 201780031322.4 second OA with English Translation; 17 pages.

Third Chinese Office Action dated May 7, 2022, Chinese Application No. 201780047682.3, 17 pages.

* cited by examiner

ULTRASOUND LENS STRUCTURE CLEANER ARCHITECTURE AND METHOD USING STANDING AND TRAVELING WAVES

CROSS-REFERENCES TO RELATED APPLICATIONS

This application is a continuation of U.S. patent application Ser. No. 15/395,665, filed on Dec. 30, 2016, the contents of which are herein incorporated by reference in its entirety.

STATEMENT REGARDING FEDERALLY SPONSORED RESEARCH OR DEVELOPMENT

Not Applicable.

BACKGROUND OF THE INVENTION

The preferred embodiments relate to various systems where debris or contaminants are to be removed from lens-related apparatus in the system, and more particularly to an ultrasound architecture and method in such a system.

A lens structure as used in this document is intended to include a lens, lens cover, or other surface through which a signal (e.g., light) may pass, and where the apparatus is exposed to potential contaminants that may reduce the likelihood of successful signal passage through the apparatus. As one prominent example, in the automotive industry, cameras are assuming an important role in both Driver-Assisted Systems (DAS) and automatic safety systems. This technology commonly first appeared in relatively expensive vehicles and has migrated to less expensive ones. Indeed, the National Highway Traffic Safety Administration (NHTSA) has mandated that all new cars must be outfitted with rear view cameras by 2018. Cameras are also now being incorporated into side view mirrors to assist drivers with lane changes and currently under consideration by at least one automobile manufacturer is the possible replacement of vehicle side view mirrors with side view cameras. Besides alleviating blind spots for the driver, front cameras integrated into the windshield provide Forward Collision Warning (FCW), Following Distance Indication (FDI), and Lane Departure Warnings (LDW). Of course, lens structures also may be used in other implementations, including, for example, outdoor surveillance cameras and lighting systems.

In the above context and others, and as the trend toward additional lens structures increase or become more ubiquitous, keeping the lens structure (e.g., lenses and lens covers) free of contaminants becomes a more prevalent need and is particularly important in safety-related applications. Further, the location, accessibility, or the user interest may prove inconvenient for manual cleaning of the lens, so that automated approaches may be desirable. As one prior art approach to this issue, several manufacturers have considered a miniature spray and wiper system. This design, however, requires (1) a small pump and nozzle; (2) a motorized wiper assembly; and (3) a running a hose from a fluid tank to the location of the nozzle, which may necessitate a run from the vehicle front where a fluid tank is typically located, to the vehicle back, at least for the rear view camera, which is typically located at the rear of the vehicle. As a result, this design is mechanically complex and potentially expensive.

Given the preceding, the present inventors seek to improve upon the prior art, as further detailed below.

BRIEF SUMMARY OF THE INVENTION

In a preferred embodiment, there is a lens structure system. The system comprises a lens structure and a multi-segmented transducer coupled to the lens structure. Each segment in the plurality of segments comprises a first conductor and a second conductor, wherein the first conductor and the second conductor are electrically coupled to the segment. The system also comprises circuitry for applying a voltage to selected segments in the plurality of segments, wherein the circuitry for applying a voltage comprises circuitry for applying a voltage with standing wave signals and circuitry for applying a voltage with traveling wave signals.

Numerous other inventive aspects are also disclosed and claimed.

DETAILED DESCRIPTION OF EMBODIMENTS

Figure 1A:
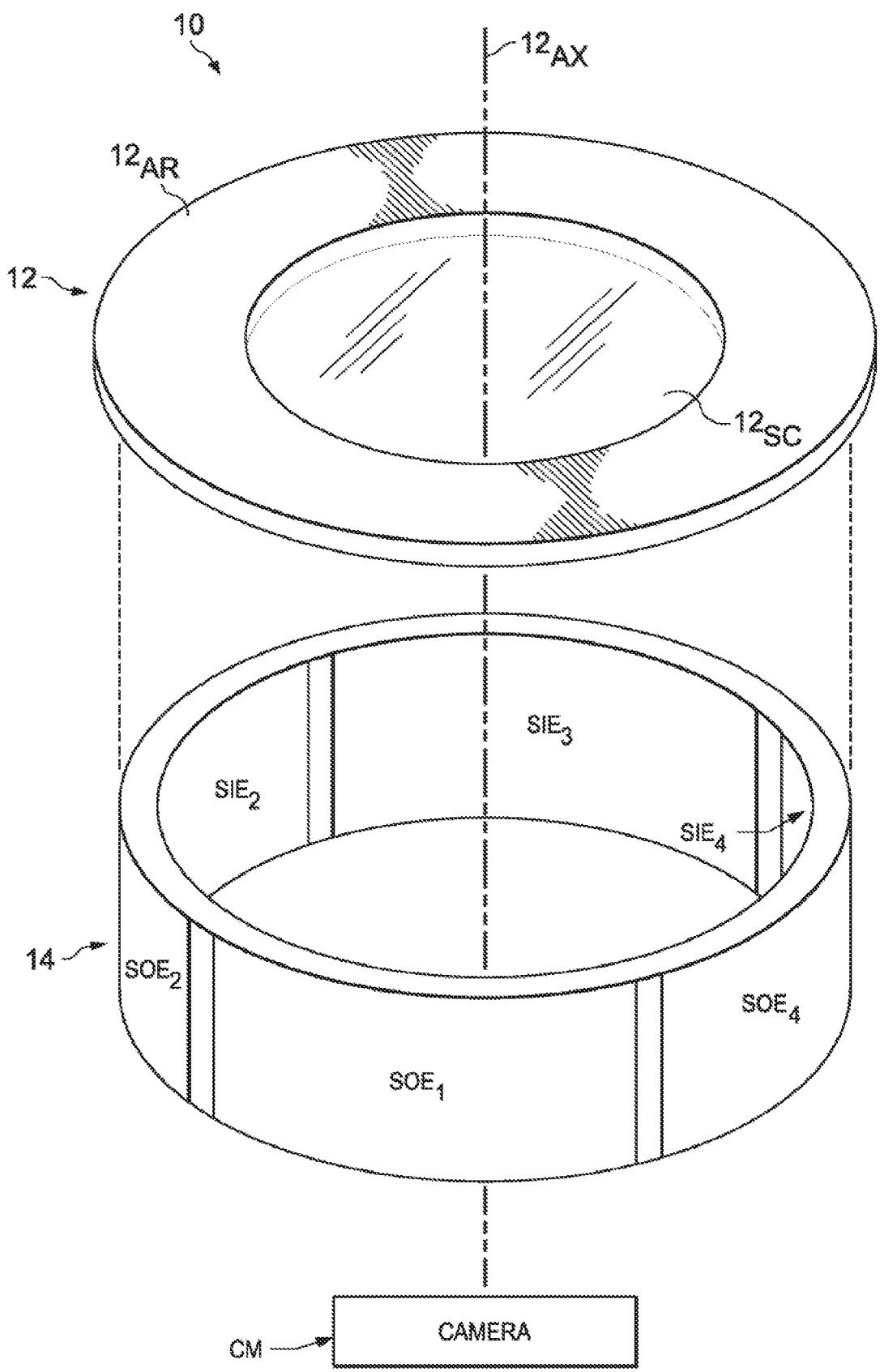
FIG. 1A illustrates a preferred embodiment system in a perspective exploded view.
Figure 1B:
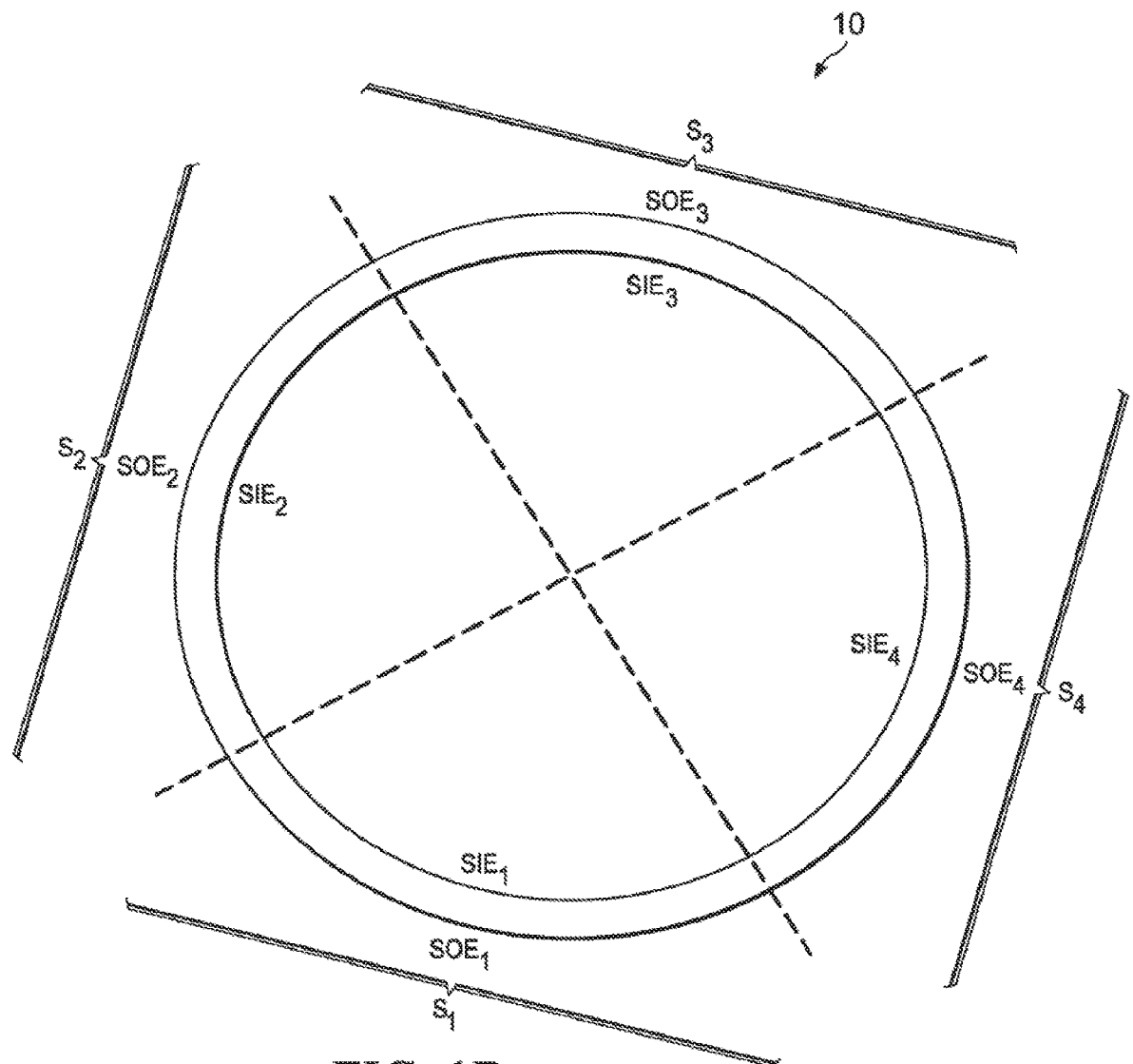
FIG. 1B illustrates a top view of the ultrasonic transducer of FIG. 1A.
Figure 1C:
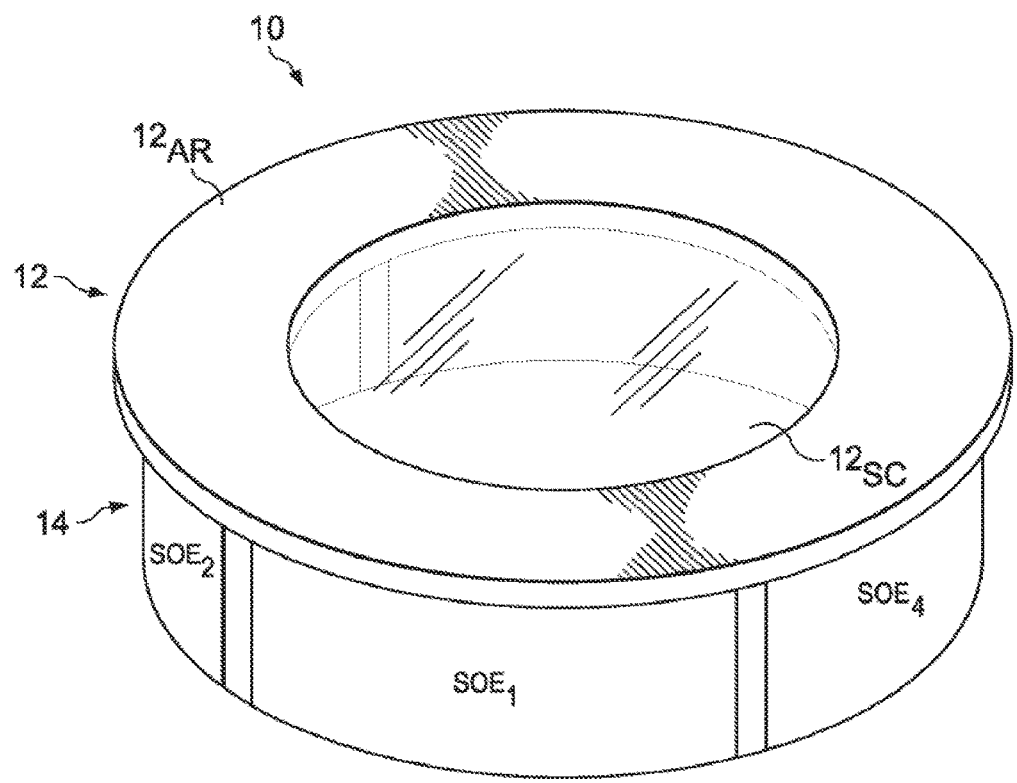
FIG. 1C illustrates the lens cover affixed atop the upper annular surface of an ultrasonic transducer.

FIGS. 1A through 1C illustrate various views of a lens structure cleaning system 10 according to a preferred embodiment. FIG. 1A illustrates system 10 in a perspective exploded view, thereby separately illustrating a lens cover 12 that is to be coupled to an ultrasonic transducer 14, that is, affixed in some manner (e.g., atop an upper annular surface, directly, or indirectly through an additional member(s)) of ultrasonic transducer 14 so that vibrations from ultrasonic transducer 14 may be transmitted either directly, or indirectly via any intermediate apparatus, to lens cover 12. FIG. 1B illustrates a top view of just ultrasonic transducer 14, and FIG. 1C illustrates lens cover 12 once affixed atop the upper annular surface of an ultrasonic transducer 14, as may be achieved via various adhesives that may be selected by one skilled in the art. Various aspects of system 10 are further described below, with reference to all three of these figures, and additional features may be included in connection with system 10 (e.g., seals, housings, and the like), but such features are not described so as to focus the discussion on preferred embodiment aspects.

Lens cover 12 is intended to represent any type of lens structure as was introduced in the Background of The Invention section of this document. In the example of system 10, lens cover 12 is a disc with a transparent center section $12_{SC}$ (shown with a contrasting shading for distinction to the remainder) and an outer annular ring $12_{AR}$ that surrounds transparent center section $12_{SC}$. Thus, in general light in the visible spectrum may readily pass through transparent center section $12_{SC}$, while it is otherwise blocked by outer annular ring $12_{AR}$. In this manner, a preferred embodiment also may include a camera CM, and its respective lens, placed proximate to lens cover 12, whereby generally light may pass through transparent center section $12_{SC}$ so as to reach the camera lens, but the lens is otherwise protected by the additional surface provided by lens cover 12. In many environments, transparent center section $12_{SC}$ may become occluded by the presence of additional contaminating matter (e.g., dirt, water, other airborne constituents) so that light is partially or fully blocked from passing through that section, and the preferred embodiments endeavor to reduce or dispel such matter from the surface of lens cover 12.

Figure 9:
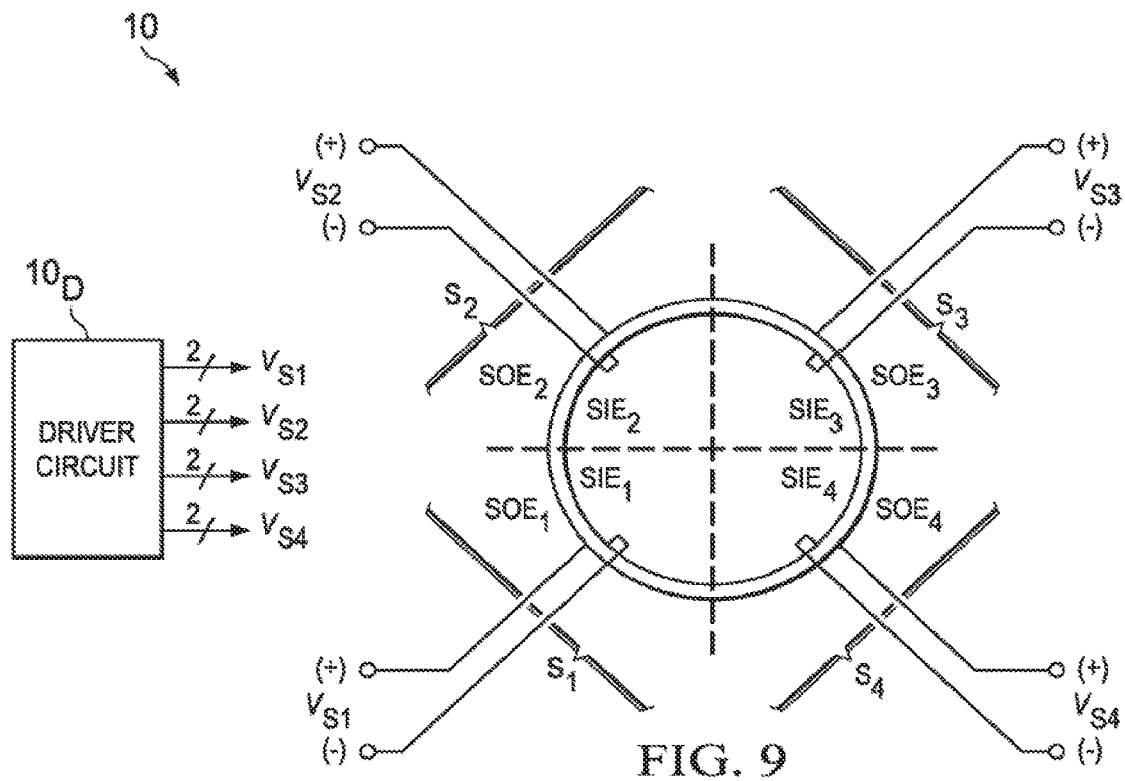
FIG. 9 illustrates a preferred embodiment transducer and biasing conductors connected thereto.

Transducer 14, in a preferred embodiment, is formed from a cross-section of a cylindrical piezoelectric material, and preferably it has an outer diameter smaller than the outer diameter of lens cover 12. By way of example, therefore, the outer diameter of transducer 14 may be 10 to 30 mm, while the larger outer diameter of lens cover 12 may be 12 to 35 mm Thus, once assembled (e.g., FIG. 1C), the outer perimeter of lens cover 12 extends in some margin beyond the outer diameter of transducer 14. As appreciated below, such a configuration may improve the effectiveness of standing and traveling waves transmitted from transducer 14 to lens cover 12, thereby improving the ability to dispel contaminants from the surface of that lens cover. Transducer 14 is a segmented transducer, as defined by having plural circular sectors, each having a pair of conductors so as to apply a voltage to the sector. In the example illustrated, transducer 14 has four such segments (or sectors), shown in FIG. 1B as $S_1$, $S_2$, $S_3$, and $S_4$, each consisting of approximately, or slightly less than, 90 degrees of the entire 360 degree circular cross-sectional perimeter of the transducer. Each segment $S_x$ has an outer electrode $SOE_x$ and an inner electrode $SIE_x$, as may be achieved by silk-screening or otherwise attaching a thin conductive material to the respective outer and inner diameter of the piezoelectric material. As shown in a later FIG. 9, a preferred embodiment may include electrical connectors/wires connected to each of the illustrated electrodes, and a driver circuit for outputting signals to the conductors, whereby such signals are therefore applied, and alternated in amplitude, sign, and frequency, so as to achieve various preferred embodiment aspects further described below.

Given the preferred embodiment apparatus described above, transducer 14 may be excited with various signals so as to communicate vibrational forces into the abutted lens cover 12. Such waves may be communicated in three different vibration modes, namely, radial mode at low frequencies (e.g., 44 kHz) and which are along the radii of the circular cross section of transducer 14, axial mode at relative middle frequencies (e.g., 250 kHz), which are in the direction of the axis of the cylindrical transducer (i.e., vertical in FIGS. 1A-1C), and a wall mode at higher frequencies (e.g., 2 MHz), which are modes that represent the radial motion of the wall thickness with respect to the outer wall of transducer 14. In a preferred embodiment, axial mode vibrations are preferred, as they are likely to cause vibrations that are tangential from the surface of lens cover 12, thereby providing a greater likelihood of dislodging certain contaminants (e.g., dust, water) from that surface. Note that frequency ranges of the various mode types may overlap. For example, high order radial modal frequencies will overlap with the axial modal frequencies, and high order axial modal frequencies will overlap with wall modal frequencies. However, in practice, this is not normally an issue because as mode orders increase, so does the modal damping.

Further to the preceding, also in the preferred embodiment, the vibrational forces are applied at excitation amplitudes and frequencies so as to transmit both standing and traveling waves, either in sequential or concurrent fashion, into the desirably chosen circular membrane shape of the abutted lens cover 12. Thus, each type of wave is further detailed below, first with a discussion of standing waves and second with a discussion of traveling waves, with each applied to lens structure cleaning system 10.

As is known in certain areas of physics, a standing wave is a stationary vibrational pattern created within a medium when two waves of the same frequency propagate through the medium in opposite directions. As a result, regions of minimum displacement (e.g., nodes) and regions of maximum displacement (e.g., anti-nodes) are created at fixed locations in the medium. As a result, the waves cause displacement along the medium (i.e., lens cover 12 in this instance), yet at the physical locations where wave interference occurs, there is little or no movement. Hence, in a circular membrane as exists in the preferred embodiment, where standing waves are so transmitted, the art defines certain mode shapes of the vibrational tendencies and movements of the surface being vibrated. Each mode shape is identified in the art by a convention of mode (d,c) shape, where d is the number of nodal diameters across the membrane surface, and c is the number of nodal circles at or within the perimeter of the circular membrane, where the term nodal (or node) refers to a point, line, or circle on the structure that has zero amplitude vibration, that is, it does not move, while the rest of the structure is vibrating. Various examples of mode shapes, by way of introduction and also in connection with preferred embodiments, are further explored below.

Figure 2A:
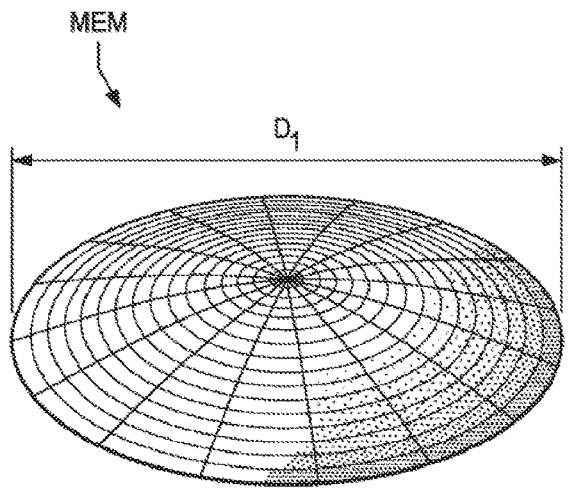
FIGS. 2A and 3A illustrate perspective views.
Figure 2B:
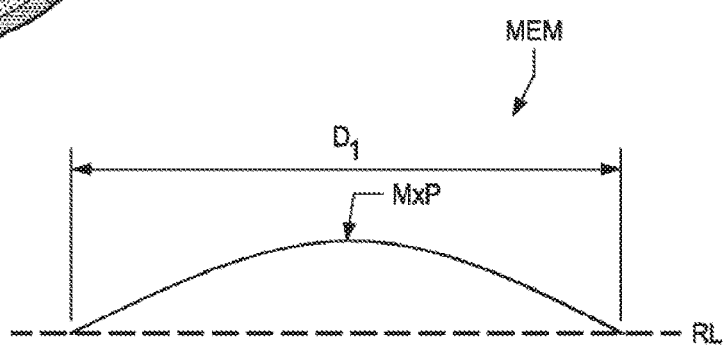
FIGS. 2B and 3B illustrate side views, of a membrane MEM and its mode shape diagrams of a first mode (0,1) shape.
Figure 3A:
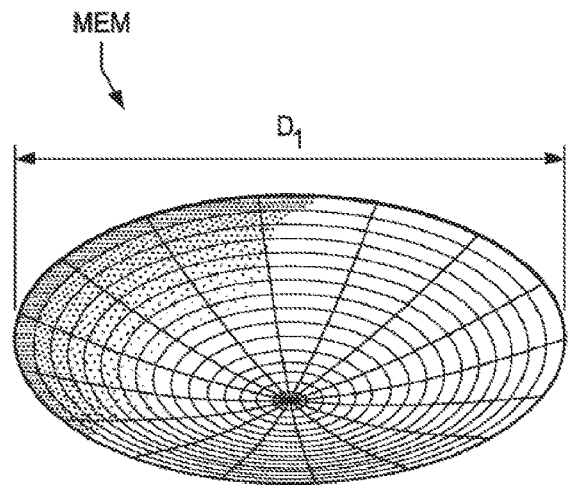
Figure 3B:
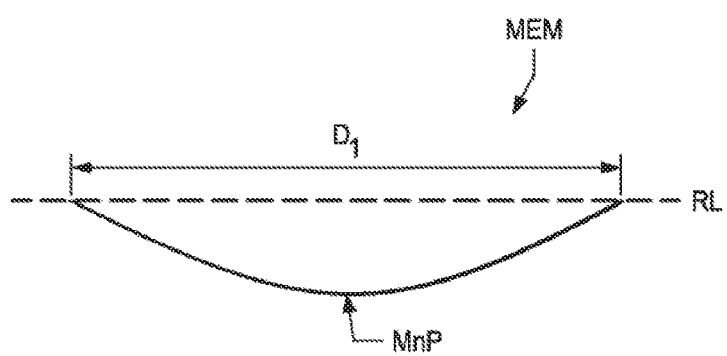

To further introduce mode shapes and various preferred embodiment aspects, FIGS. 2A and 3A illustrate perspective views, and FIGS. 2B and 3B illustrate side views, of a membrane MEM and its mode shape diagrams of a first mode (0,1) shape in a standing wave excitation that may be achieved by applying a voltage to the multiple-segmented transducer 14 of the preferred embodiment as if it were a single segmented transducer; such an effect may be achieved, therefore, by applying a first sine wave potential to all of its outer electrodes and a second sine wave potential, 180 degrees offset from the first sine wave (also achievable by 180 degree apart cosine potentials, instead of sine), to all of its inner electrodes, where both sine waves have a same first modal frequency. Alternatively, the effect may be achieved by applying a sine wave potential to all of the outer electrodes while connecting the inner electrodes to ground (or, vice versa, that is, grounding the outer electrodes and connecting the same sine wave to all inner electrodes). A modal frequency is one of the resonant frequencies for the system under consideration (i.e., here, lens cover 12), where the particular resonant frequency, among multiple resonant frequencies of the system, causes the shape of the respective mode. In this regard, FIGS. 2A, 2B, 3A, and 3B, therefore, represent an instance where transducer 14 receives a voltage and first modal frequency, $f_{m(0,1)}$, which creates mode (0,1) shape, also known as a "cupping" mode, as further detailed below.

The depictions of FIGS. 2A and 3A are generally representative of a perspective circular shape as shown by concentric circles between a center point and the outer perimeter. Radial lines are also shown, and if the shape were flat such lines would be straight. A curved radial line, however, suggests movement along the line. In this regard, therefore, FIG. 2A is intended to illustrate a first extreme of the oscillatory movement of member MEM, where the surface bends upward (e.g., for reference, in a positive direction) with a maximum peak elevation at the center of the shape (also shown by light gray shading). The upward bend is also appreciated in the counterpart side view of FIG. 2B, which shows the mode surface as contrasted to a horizontal, or flat, reference line RL that is shown by a dashed line, and the maximum peak MxP is also indicated. In opposite fashion, FIG. 3A is intended to illustrate a second extreme of the oscillatory movement of member MEM, where the surface bends downward (e.g., for reference, in a negative direction) also with a peak elevation at the center of the shape (also shown by dark gray shading). The downward bend is also appreciated in the counterpart side view of FIG. 3B, in which the minimum peak MnP is also indicated.

Given the illustrations of FIGS. 2A, 2B, 3A, and 3B, note that the reference of a mode (0,1) indicates zero (i.e., d=0) nodal diameters and a single (i.e., c=1) nodal circle, the latter shown as $D_1$. Note that the location of the nodal circle will depend on the conditions at the boundary of the membrane, where the illustrations assume that boundary is claimed; however, if the boundary were not claimed, the radial location of the nodal circle will change. In other words, as member MEM oscillates between the extreme positions shown in the Figures, a single circle, around the outside perimeter, does not vibrate. The vibrations inside nodal circle with diameter $D_1$, therefore, will have some efficacy in removing contaminants that are on the surface of member MEM, but any matter that lands farther from the center and thus closer to the nodal circle with diameter $D_1$ may not experience sufficiently high acceleration to be removed. Further, material in high vibration zones may be pushed toward the nodal circles. Still further, and as appreciate later, a singular mode (0,1) has a limited area on membrane MEM that may reach a desirable amount of axial acceleration, thereby limiting the ability of the membrane to dispel contaminants.

Figure 4A:
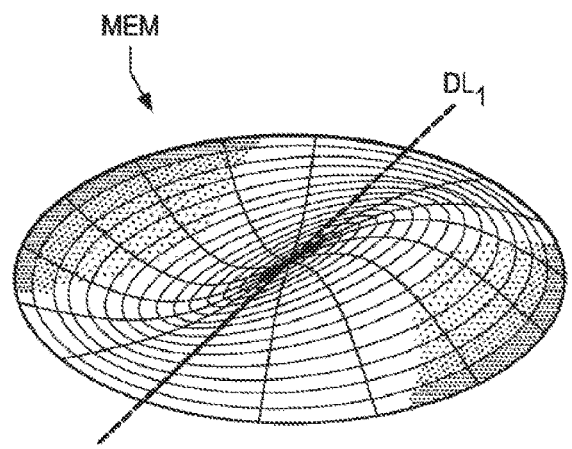
FIGS. 4A and 5A illustrate perspective views.
Figure 4B:
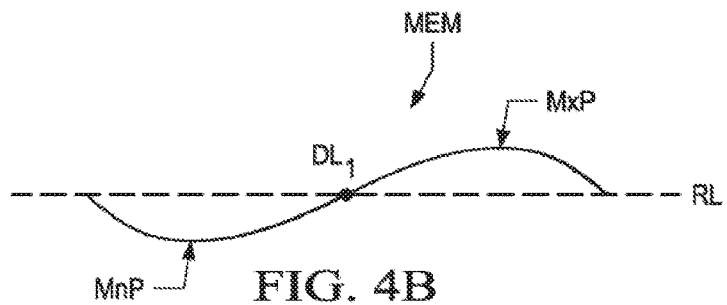
FIGS. 4B and 5B illustrate side views, of a membrane MEM and its mode shape diagrams of a second mode (1,1) shape.
Figure 5A:
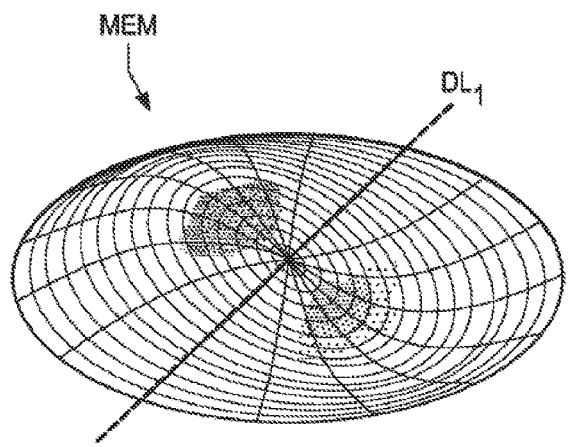
Figure 5B:
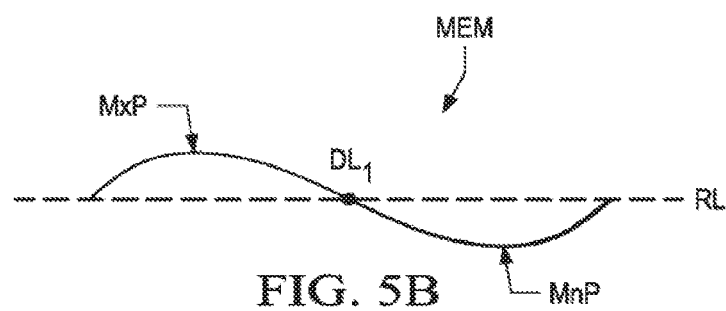
Figure 6:
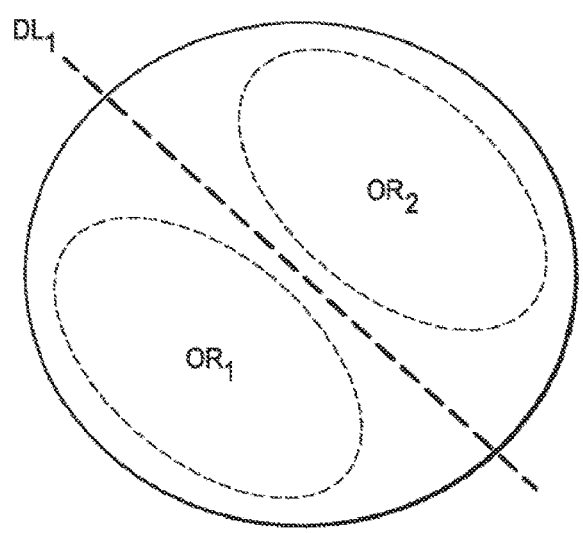
FIG. 6 illustrates a top view of the two separate oscillating regions $OR_1$ and $OR_2$, about line $DL_1$, as achieved in FIGS. 4A and 4B.

By way of an additional example, FIGS. 4A and 5A illustrate perspective views, and FIGS. 4B and 5B illustrate side views, of a membrane MEM and its mode shape diagrams of a second mode (1,1) shape in a standing wave excitation that may be achieved by applying a first sine wave to two adjacent segments (e.g., $S_1$, $S_2$) of the multiple-segmented transducer 14, while simultaneously applying the negative of that sine wave to the remaining two adjacent segments (e.g., $S_3$, $S_4$), again therefore where one applied signal (e.g., sine wave) is 180 degrees out-of-phase with respect to the other. Note that the second mode (1,1) shape, as well as other standing wave mode shapes, may be achieved in other manners consistent with preferred embodiments, and for additional information in this regard the reader is invited to review U.S. patent application Ser. No. 15/225,212, filed Aug. 1, 2016, which is hereby incorporated fully herein by reference. The depictions of FIGS. 4A and 5A are again representative of a perspective circular shape as shown by concentric circles and radial lines, where FIG. 4A is intended to illustrate a first extreme of the oscillation, and FIG. 5A is intended to illustrate a second and opposite extreme of the oscillation. In the first extreme shown in FIG. 4A, and in the counterpart horizontal plot of FIG. 4B, membrane MEM has a maximum peak (i.e., positive) amplitude MxP in a first region on the right side of a nodal diameter line $DL_1$, while at the same time membrane MEM also extends downward below the reference line RL and has a minimum peak (i.e., negative) amplitude MnP in a second region on the left side of nodal diameter line $DL_1$. In the second extreme shown in FIG. 5A, and in the counterpart horizontal plot of FIG. 5B, membrane MEM has a maximum peak MxP on the left side of nodal diameter line $DL_1$, while at the same time membrane MEM also extends downward below the reference line RL and has a minimum peak amplitude MnP on the right side of nodal diameter line $DL_1$. As can be seen in these Figures, therefore, in mode (1,1) shape for a standing wave, membrane MEM again has a nodal circle around its outer perimeter. In addition, however, one diameter line $DL_1$ represents a nodal line, as oscillations occur left and right of that line, due to the voltage applied to opposing pairs of conductors/electrodes as introduced just above (or as achieved in other manners, again, for example with reference to the above-incorporated U.S. patent application Ser. No. 15/225,212). Thus, to further illustrate additional aspects below, the alternative oscillations about diameter line $DL_1$ also may be represented in a top view, as is shown in FIG. 6, which generally illustrates the two separate oscillating regions $OR_1$ and $OR_2$, about line $DL_1$.

Figure 7A:
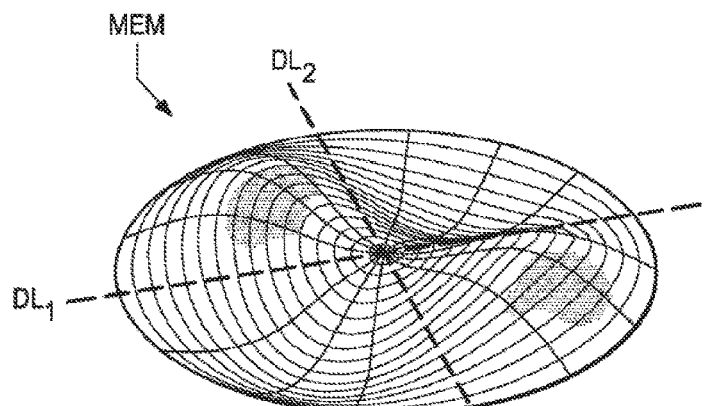
FIGS. 7A and 8A illustrate perspective views.
Figure 7B:
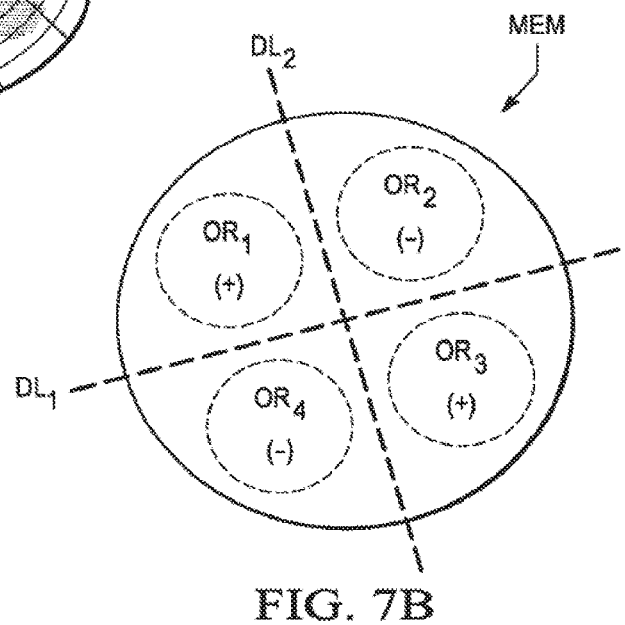
FIGS. 7B and 8B illustrate top views, of a mode (2,1) shape.
Figure 8A:
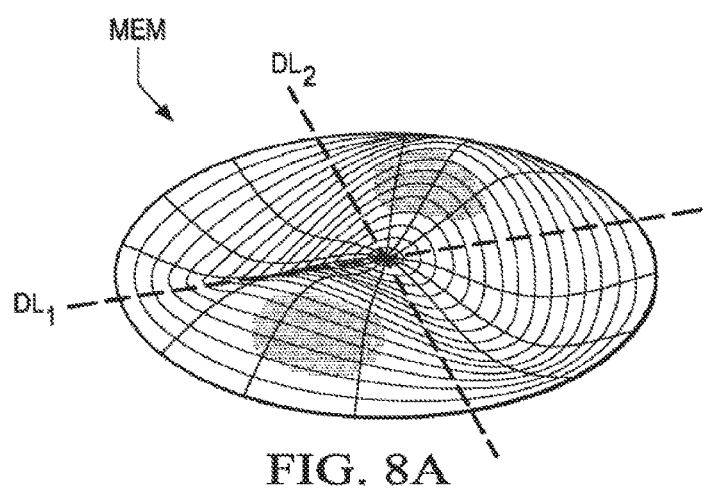
Figure 8B:
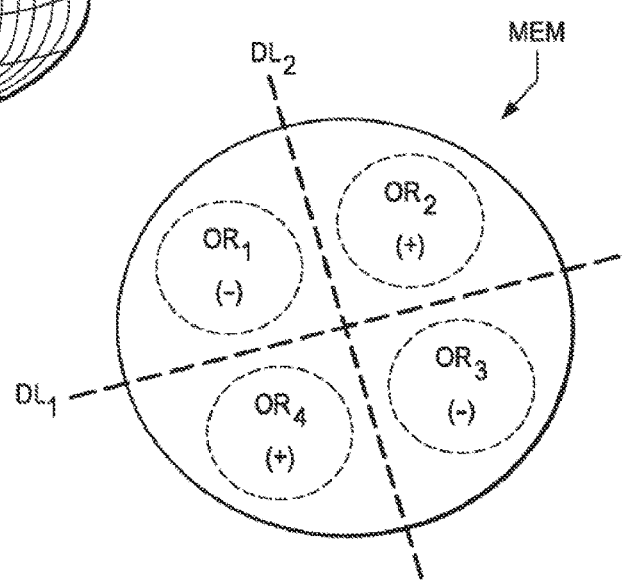

By way of one additional example, FIGS. 7A and 8A illustrate perspective views, and FIGS. 7B and 8B illustrate top views, of a membrane MEM and its mode shape diagrams of a third mode (2,1) shape in a standing wave excitation that may be achieved by applying a first sine wave to two opposing segments (e.g., $S_1$, $S_3$) of the multiple-segmented transducer 14, while simultaneously applying the negative of that sine wave to the remaining two opposing segments (e.g., $S_2$, $S_4$), again where one applied signal (e.g., sine wave) is 180 degrees out-of-phase with respect to the other. One skilled in the art will appreciate from earlier discussions that again the depictions of FIGS. 7A and 7B illustrate a first extreme of the oscillation, while FIGS. 8A and 8B illustrate a second and opposing extreme of the oscillation. In the top views of FIGS. 7B and 8B, therefore, there are four oscillating regions $OR_1$ through $OR_4$, also marked with either a "+" indication to designate a positive peak at a given time or a "−" indication to designate a negative peak at the given time.

The vibrational mode examples in the above-discussed Figures represent the lowest resonant frequencies of a circular plate system. They are also the most practical ones because they require the least amount of energy needed for excitation. Depending on the drive signal's frequency and the geometry of the electrodes, the actual vibration pattern can be one of the above-discussed mode shapes or a combination of them. In any case, they are standing waves. Moreover, having described various examples, they also may be characterized mathematically, as to generate a standing wave with the (d, 1) mode when d>0, the circular transducer is divided into 2d channels of equal arc length and inputs are set as shown in the following Equation 1:

$$S_{2k-1}=S_0\sin(\omega_0 t), S_{2k}=S_0\sin(\omega_0 t), k=1,\ldots,d \qquad \text{Equation 1}$$

where, $\omega_0$ is the resonant frequency of the (d, 1) mode. For the case when d=0, only one channel is needed.

FIG. 9 again illustrates transducer 12 in the same general manner as depicted in FIG. 1B, although in FIG. 9 the illustration is rotated for sake of reference. Further, conductors are shown connected to each respective pair of a respective outer electrode $SOE_x$ and a segment inner electrode $SIE_x$, and system 10 is also shown to include a driver circuit $10_D$ for providing voltage signals to the illustrated conductors, where each voltage output from circuit $10_D$ is shown as two signals, so as to suggest the polarity of any signal can be reversed, in order to obtain additional signal and responsive wave options, as understood later. Thus, a potential is defined between each paired set of conductors. For example, the voltage between outer electrode $SOE_1$ and inner electrode $SIE_1$ is defined as $v_{S1}$, and note the (+) and (−) conventions are used to define a polarity for sake of reference, but as detailed below not to suggest that the outer electrode is always positive with respect to its inner counterpart. To further illustrate this convention, therefore, a voltage of +1V applied to $v_{S1}$ is intended to suggest that the one volt is positive to outer electrode $SOE_1$ relative to inner electrode $SIE_1$, while a voltage of −1V applied to $v_{S1}$ is intended to suggest that the one volt is negative to outer electrode $SOE_1$ relative to inner electrode $SIE_1$. In any event, therefore, driver circuit $10_D$ may apply any of the illustrated voltages $v_{S1}$, $v_{S2}$, $v_{S3}$, and $v_{S4}$. For example, a sine wave at a modal resonant frequency $f_{m(1,1)}$ may be applied to one pair of conductors/electrodes, with a 180 degree opposite phase sine wave at the same resonant frequency $f_{m(1,1)}$ applied to an opposing pair of conductors/electrodes. Thus, in a preferred embodiment, a first phase of the sine wave is applied to $v_{S1}$, while a second phase of the sine wave, 180 degrees apart from the first phase, is applied to $v_{S3}$; at the same time, no voltage is applied to $v_{S2}$ or $v_{S4}$. Alternatively to achieve the same mode (1,1), a sine wave at a modal resonant frequency $f_{m(1,1)}$ may be applied to two adjacent conductors (and their respective electrodes), with a 180 degree opposite phase sine wave at the same resonant frequency $f_{m(1,1)}$ applied to an opposing pair of adjacent conductors (and their respective electrodes). Thus, in a preferred embodiment, a first phase of the sine wave is applied to $v_{S1}$ and $v_{S2}$, while a second phase of the sine wave, 180 degrees apart from the first phase, is applied to $v_{S3}$ and $v_{S4}$.

It is therefore recognized in connection with the above that certain modes achievable by transducer 14, if driven with applied voltages to various segments will result in symmetric mode shapes. For example the (0,1) shape has a single outer nodal circle with diameter $D_1$ at its perimeter, and inside that perimeter the flexing is circularly symmetric as shown by the comparable concentric circles with radii inside that outer nodal circle, and the greatest amount of displacement is achieved closer to the membrane center. As another example, the (1,1) shape also has an outer nodal circle at its perimeter, but instead of extreme flexing at the center achieved by the (0,1) shape, peaks are achieved off center but at two different regions; however, a nodal diameter line is created, along which there is no displacement. As still another example, the (2,1) shape creates peaks off center and at four different regions; however, two nodal diameter lines are created, along which there is no displacement. In all events, therefore, either the drop off in displacement at increased radial lengths of the (0,1) shape, or the additional nodal diameters of the (1,1) and (2,1) shape, demonstrate that such shapes may be less likely to expel certain contaminants from lens cover 12 in locations where there is little vibration, that is, it may tend to accumulate contaminants in nodal circles or diameters. The preferred embodiments include additional modes of operation, therefore, so as to achieve improved results over these considerations, as further explored below.

In another aspect of a preferred embodiment, and to overcome the limitations noted above with respect to contaminants accruing at nodal points, circles, or lines, a preferred embodiment further combines both standing and traveling waves in system 10, either time multiplexed or concurrently, as will now be further explored. Specifically, a traveling wave has a wave front that moves as a periodic wave across a surface and therefore, apart from the outer perimeter of the lens cover and arguably the center point of the surface around which the wave rotates, has no other stationary point, as compared to various standing waves which, as demonstrated above, can have one or more points, lines, or circles that are stationary, despite movement elsewhere on the surface. Moreover, the same system 10 described above with respect to standing waves also may readily be biased, via driver circuit $10_D$, so as to also achieve mechanical traveling waves. By way of introduction, various such traveling waves may be achieved by biasing adjacent ones of the four segments with signals that are 90 degrees apart. The relationship is described mathematically below according to the following Equations 2 through 5:

$$S_{4k-3}=S_0\sin(\omega_0 t) \qquad \text{Equation 2}$$

$$S_{4k-2}=S_0\cos(\omega_0 t) \qquad \text{Equation 3}$$

$$S_{4k-1}=-S_0\sin(\omega_0 t) \qquad \text{Equation 4}$$

$$S_{4k-1}=-S_0\cos(\omega_0 t), k=1,\ldots N \qquad \text{Equation 5}$$

where, $\omega_0$ is the resonant frequency of the [N,1] standing wave.

Implementation of the preceding into system 10 will generate a traveling wave for the (d, 1) mode, whereby the traveling wave front will rotate around the longitudinal axis $12_{AX}$ of the circular lens cover 12 (or other membrane or plate). The direction of rotation can be reversed by reversing the polarity of the inputs in any one set and keeping the other set unchanged. Various implementation details are examples are explored below.

Figure 10:
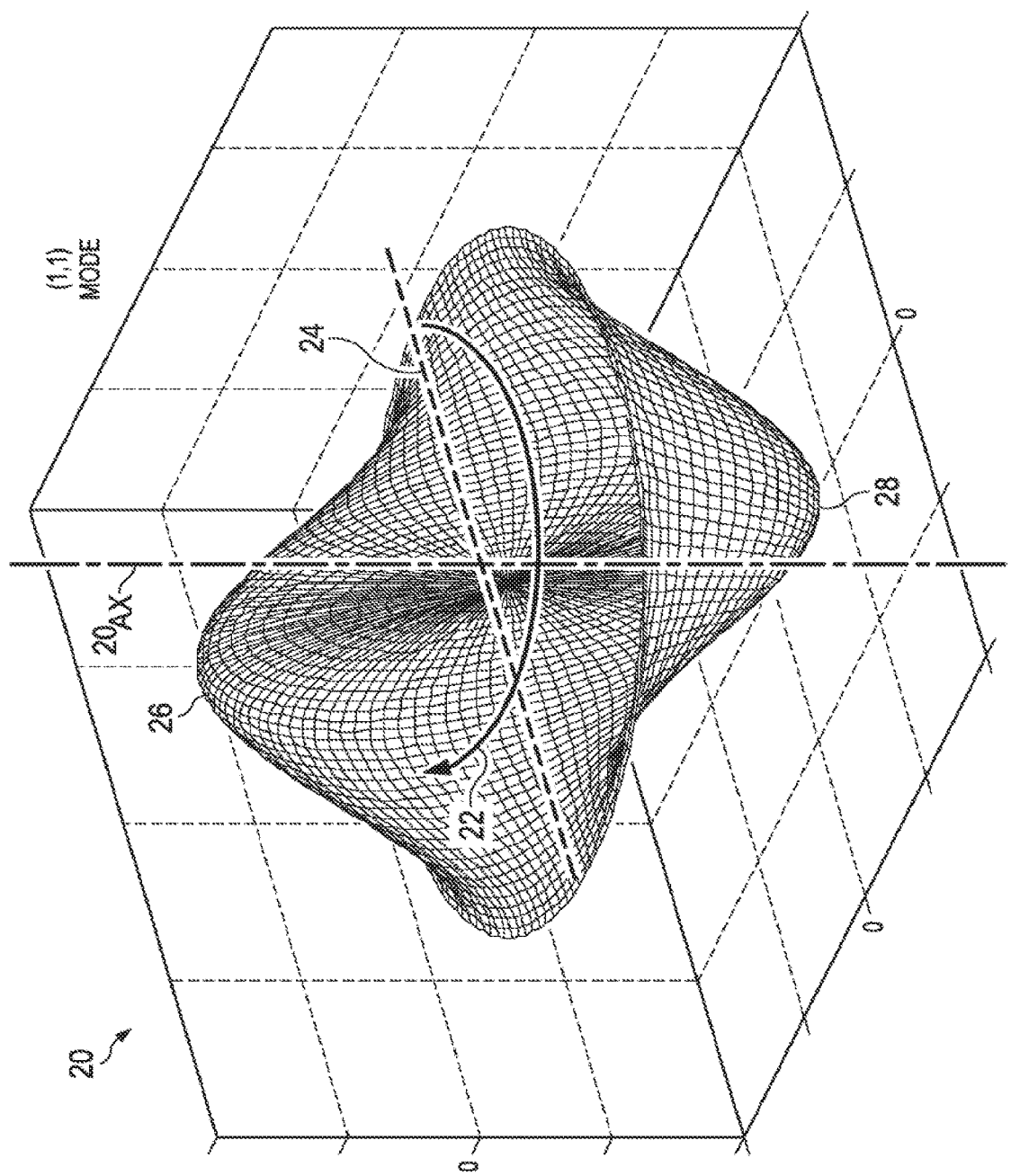
FIG. 10 illustrates an example mechanical traveling wave graph implementing a (1,1) mode.
Figure 11:
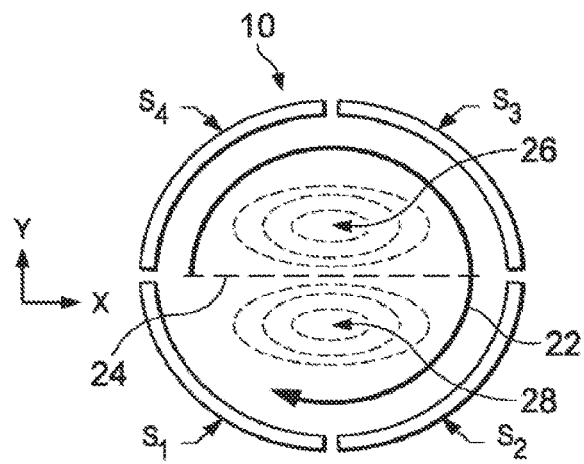
FIGS. 11 through 14 illustrate top views of example positions of the wave of FIG. 10.
Figure 12:
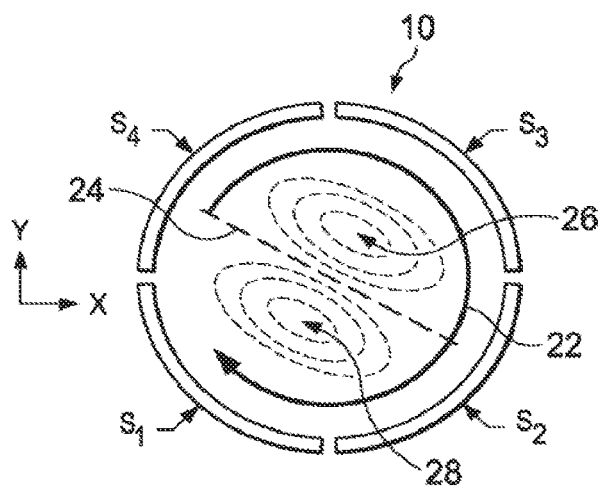
Figure 13:
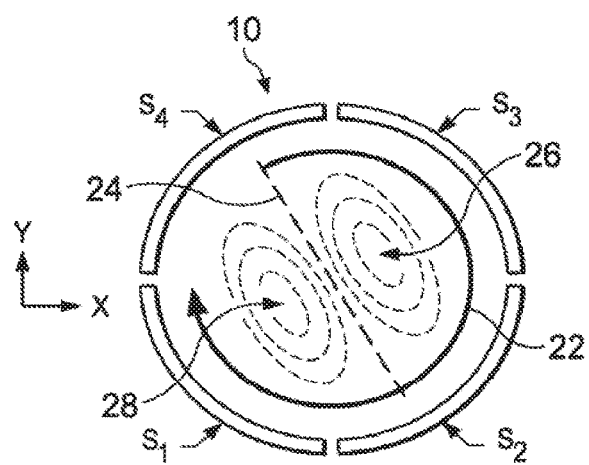
Figure 14:
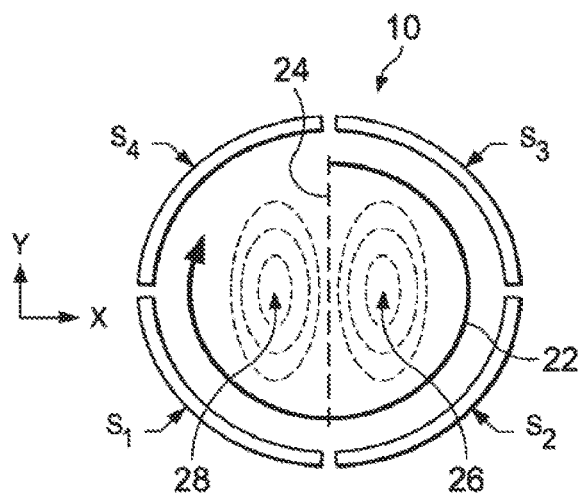

FIG. 10 illustrates an example mechanical traveling wave graph 20 implementing a (1,1) mode traveling wave excitation in system 10 of FIGS. 1A through 1C, and FIGS. 11 through 14 illustrate the traveling wave rotating around the center axis $12_{AX}$ of lens 12. The mode designations in these examples are for circular traveling waves (d,c) modes having, at an instantaneous point in time where the wave can per perceived as not moving, d nodal diameters and c nodal circles (including the boundary), where d>0 and c>0. In other words, such nodes are points or lines on the lens structure that are momentarily at rest in a time instant, but the traveling wave excitation causes the nodes to rotate about the lens center axis $12_{AX}$. In the example of FIG. 10, the traveling wave rotates in a clockwise direction 22 when viewed from above and relative to axis $20_{AX}$. In this (1,1) mode example, moreover, a single node diameter 24 extends in the indicated X-Y plane about the Z direction axis $20_{AX}$. Thus, FIG. 10 illustrates a traveling wave excitation of a planar lens 12 (not shown in FIG. 10) that is understood to be positioned in the X-Y plane, and the excitation causes Z-direction of motion across the lens surface with a positive Z-direction displacement maxima 26 and a negative Z-direction displacement minima 28. FIGS. 11 through 14 provide simplified views of the traveling wave rotating in the direction 22 (i.e., clockwise) at different points in time, with FIG. 11 illustrating an initial example position of the maxima 26 and the minima 28 with the intervening single node diameter 24 extending in the X direction at Y=0 between the positive and negative lobes associated with the maximum and minimal points 26 and 28. At the time represented in FIG. 12, the mechanical vibration by the transducer segments $S_1$ through $S_4$ rotates the positions of the lobes and the points 26 and 28 in the clockwise direction 22 by approximately 30 degrees. FIGS. 13 and 14 respectively illustrate further rotation in the direction 22 by additional 30 degree increments, where the node diameter 24 is positioned in the Y-direction in FIG. 14 at X=0. In operation, the phase shifted sinusoidal excitation of the transducer segments $S_1$ through $S_4$ causes a continuous rotation of the traveling wave pattern about the Z-direction lens axis. As seen in FIGS. 11 through 14, the node diameter 24 rotates or travels, in contrast to standing wave excitation techniques in which the node diameter remains stationary. Accordingly, the FIG. 9 driver circuit $10_D$ advantageously provides traveling wave excitation in which the surface area of the lens along is vibrated and thus cleaned.

The traveling wave excitation can be mathematically represented. The displacement of a circular lens 12 or other circular plate can be represented by the following Equation 6:

$$W_{n,m}(r, \theta) = \left[ J_n(\beta_{nm}r) - \frac{J_n(\beta_{nm}R)}{I_n(\beta_{nm}R)} I_n(\beta_{nm}r) \right] \begin{bmatrix} \sin n\theta \\ \cos n\theta \end{bmatrix}, \quad \text{Equation 6}$$

Where $J_n$ is the nth Bessel function, $I_n$ is the modified Bessel function of the first kind, and n and m are mode index numbers, n=0,1,2 . . . , m=1,2,3, . . . . The natural mode frequencies are given by the following Equation 7:

$$\omega_{nm} = \frac{\lambda_{nm}^2}{R^2} \sqrt{\frac{D}{\rho T}} \quad \text{Equation 7}$$

where R is the radius of the circular plate, T is its thickness, $\lambda_{nm}$ is a root to Bessel function equations, D is the lens material stiffness (determined by Young's modulus, Poisson's ratio, etc.), and p is the lens material density, thereby defining the following Equation 8:

$$R_{n,m}(r) = \left[ J_n(\beta_{nm}r) - \frac{J_n(\beta_{nm}R)}{I_n(\beta_{nm}R)} I_n(\beta_{nm}r) \right] \quad \text{Equation 8}$$

Equation 6 can be simplified as shown in the following Equation 9:

$$W_{n,m}(r, \theta) = R_{n,m}(r) \begin{bmatrix} \sin n\theta \\ \cos n\theta \end{bmatrix} \quad \text{Equation 9}$$

Solutions for W to a forced response at a resonant frequency ω are given by the following Equations 10 through 12:

$$W_1(r,\theta,t) = AR_{n,m}(r) \cos n\theta \cos \omega t \quad \text{Equation 10}$$

$$W_2(r,\theta,t) = BR_{nm}(r) \sin n\theta \sin(\omega t + \alpha) \quad \text{Equation 11}$$

$$W_3 = W_1 + W_2 \quad \text{Equation 12}$$

Rearranging $W_3$ yields the following Equation 13:

$$W_3(r,\theta,t) = \frac{1}{2} R_{n,m}(r)[(A+B \cos \alpha)\cos(n\theta-\omega t)+(A-B \cos \alpha)\cos(n\theta+\omega t)+2B \sin \alpha \sin n\theta \cos \omega t] \quad \text{Equation 13}$$

Setting α=0, and A=B, the above can be rewritten as the following Equation 14:

$$W_3(r,\theta,t) = AR_{n,m}(r)\cos(n\theta-\omega t) \quad \text{Equation 14}$$

Equation 14 defines a traveling wave with angular speed coin ω/n in a positive direction θ. By letting A=−B, the direction is reversed to the negative θ direction. The transducer segments $S_1$ through $S_4$ in this example form a circular ring shape so that the light can go through the lens 12 in the center along the direction of the axis $12_{AX}$.

From the above, one skilled in the art should appreciate that system 10, providing a transducer 14 with four channels or segments, can provide various mode shapes for both standing and traveling waves that are imposed on lens 12. Indeed, recall in connection with FIGS. 4A and 5A (and 4B and 5B), that a standing wave (1,1) shape may be actuated by driver circuit $10_D$ applying a first sine wave to two adjacent segments (e.g., $S_1$, $S_2$) of the multiple-segmented transducer 14, while simultaneously applying the negative of that sine wave to the remaining two adjacent segments (e.g., $S_3$, $S_4$), again therefore where one applied signal (e.g., sine wave) is 180 degrees out-of-phase with respect to the other. Referring to the diagram of FIG. 9, however, note that likewise a traveling wave (1,1) shape may be actuated by driver circuit $10_D$ applying 90 degree out of phase signals to each respective segment in the four segments of the multiple-segmented transducer 14, as shown in the following Table 1:

TABLE 1

| Segment | Voltage | signal |
|---|---|---|
| $S_1$ | $v_{S1}$ | sin ωt |
| $S_2$ | $v_{S2}$ | cos ωt |
| $S_3$ | $v_{S3}$ | -sin ωt |
| $S_4$ | $v_{S4}$ | -cos ωt |

Figure 15:
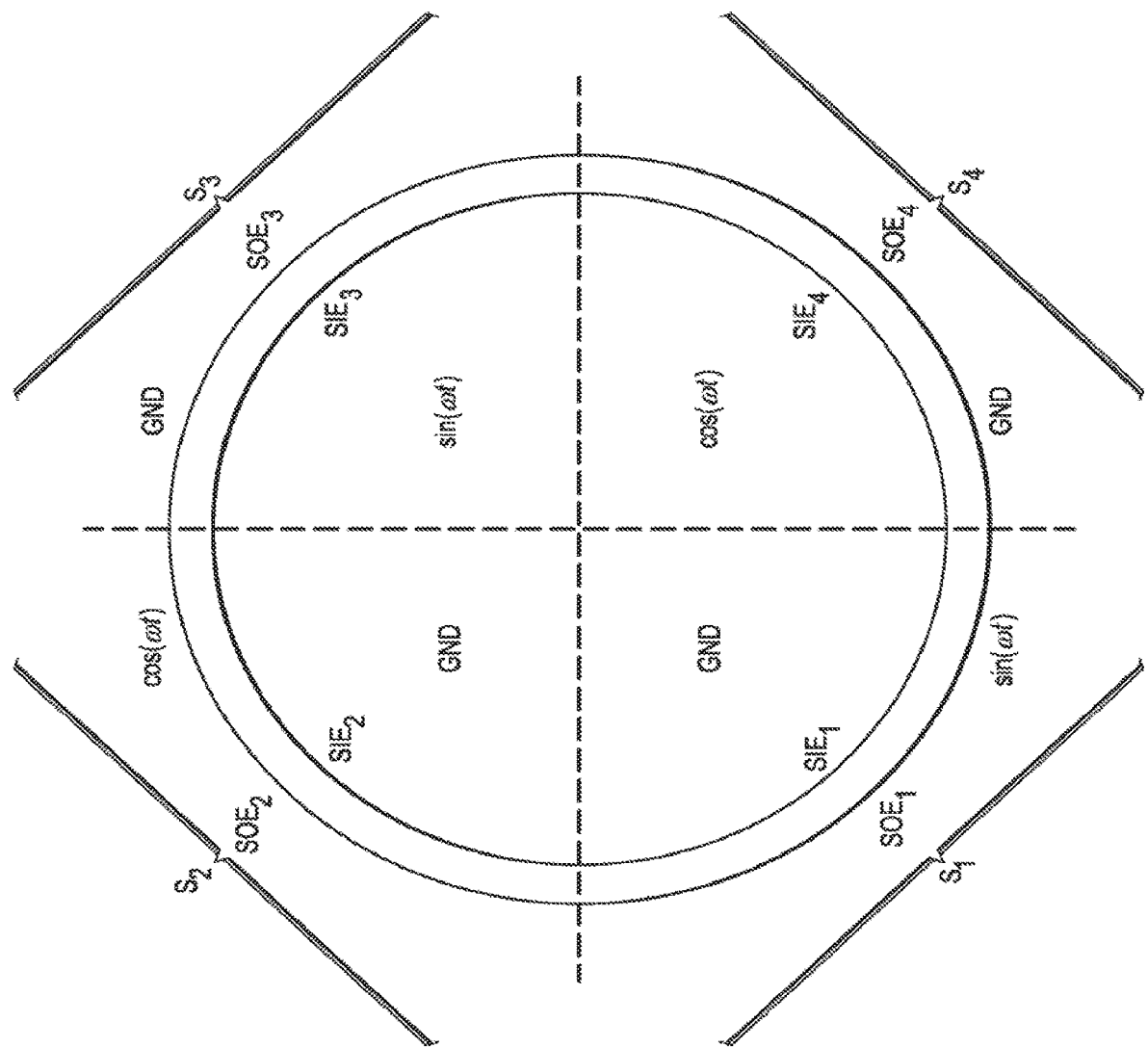
FIG. 15 illustrates biasing signals to achieve a traveling wave (1,1) mode.
Figure 16:
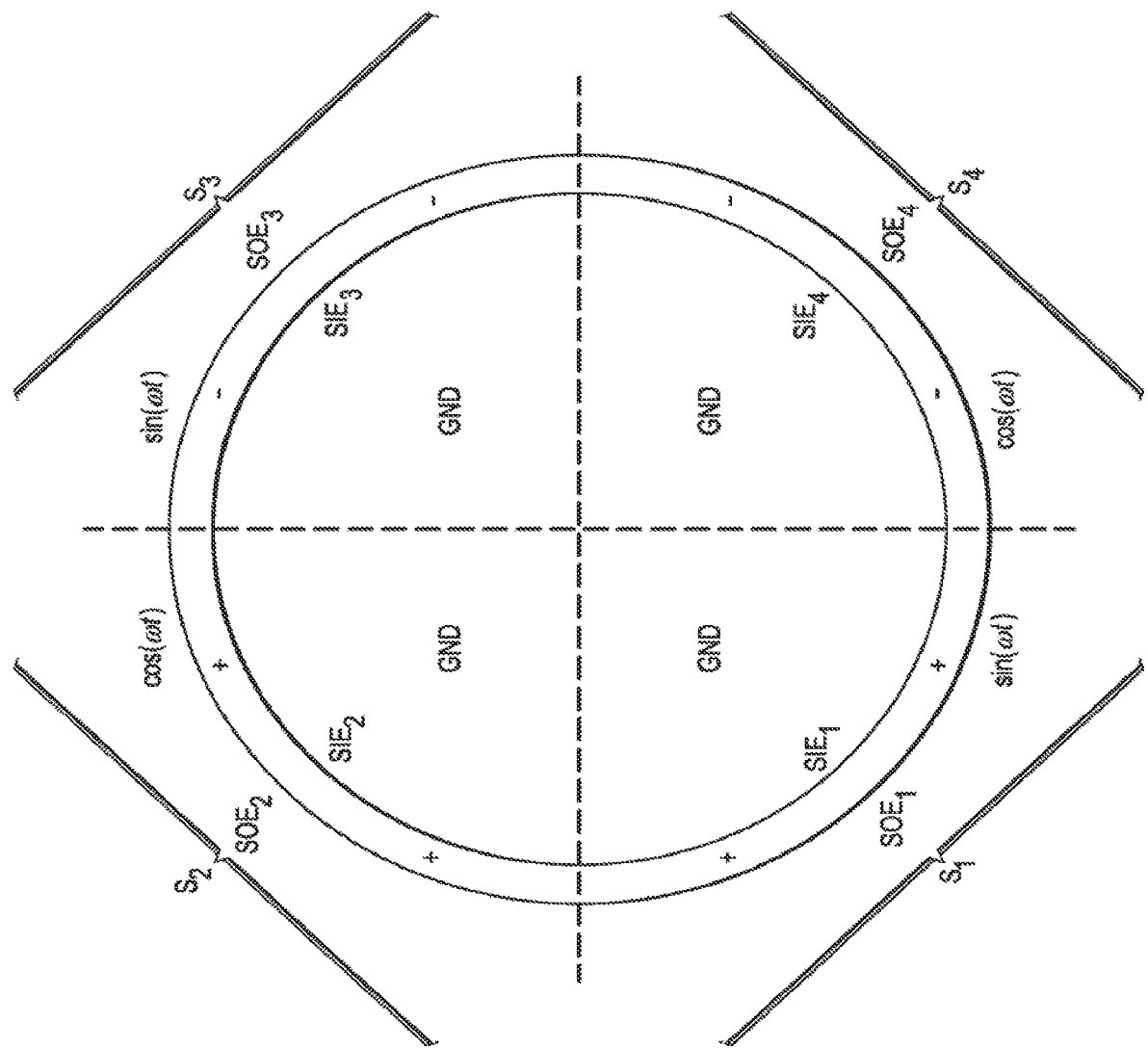
FIG. 16 illustrates using opposing polling areas and biasing signals to achieve a traveling wave (1,1) mode.
Figure 16:
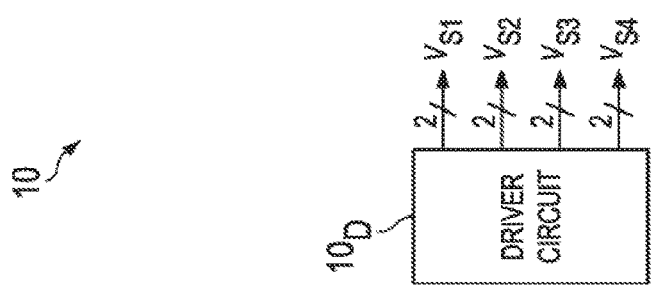

In still other preferred embodiments, note that variations may be used to achieve traveling wave patterns, including, for example, where only positive waveforms are available, for instance based on limitations from a signal wave generator. In one such instance, 90 degree phase shifts between adjacent ones of four segments may be achieved by reversing polarity. Thus, as a first example, FIG. 15 illustrates a preferred embodiment biasing in such an instance, so as to once again achieve a traveling wave (1,1) mode. Hence, in FIG. 16 and contrasting segment $S_2$ to segment $S_3$, segment $S_2$ is biased in the positive direction by the conventions of FIG. 9 and with a cosine wave, while segment $S_3$, is biased in the negative direction by the conventions of FIG. 9 and with a sine wave. Thus, a 90 degree phase shift is achieved as between these segments, as further maintained between those segments and the remaining segments $S_1$ and $S_4$ which are biased as also shown in FIG. 15. Alternatively, in a second example, FIG. 16 illustrates a preferred embodiment biasing that combines with the polling areas of the transducer segments as oriented so that the directionality of dipoles in one region (e.g., piezoelectric material) align so that when a voltage is applied thereto, the behavior of the dipoles aligned in that direction is opposite of that in a second region in which the dipoles are aligned in the opposite direction. FIG. 16 illustrates a preferred embodiment biasing in this latter instance, where the indication of "+" or "−" on a segment is intended to designate the directionality of dipoles in that segment. Thus, note that the dipoles of segments $S_1$ and $S_3$ are reversed, so that while each outer conductor in those two segments receives the signal sin ωt, the mechanical effect is 180 degrees out of phase due to the reversed polling direction of those two differing segments. Similar observations can be made with respect to the dipoles of segments $S_2$ and $S_4$ as reversed with respect to one another, so that while each outer conductor in those two segments receives the signal cos ωt, the mechanical effect is 180 degrees out of phase due to the reversed polling direction of those two differing segments. Lastly, note that additional preferred embodiments may be implemented by extending the four channel concepts described herein to higher modes using a transducer with more channels (preferably in multiples of four segments, i.e., 8 segments, 12 segments, and so forth). Further in this regard, the reader is invited to review co-owned U.S. patent application Ser. No. 15/186,944, filed Jun. 20, 2016, which is hereby incorporated fully herein by reference.

Figure 17:
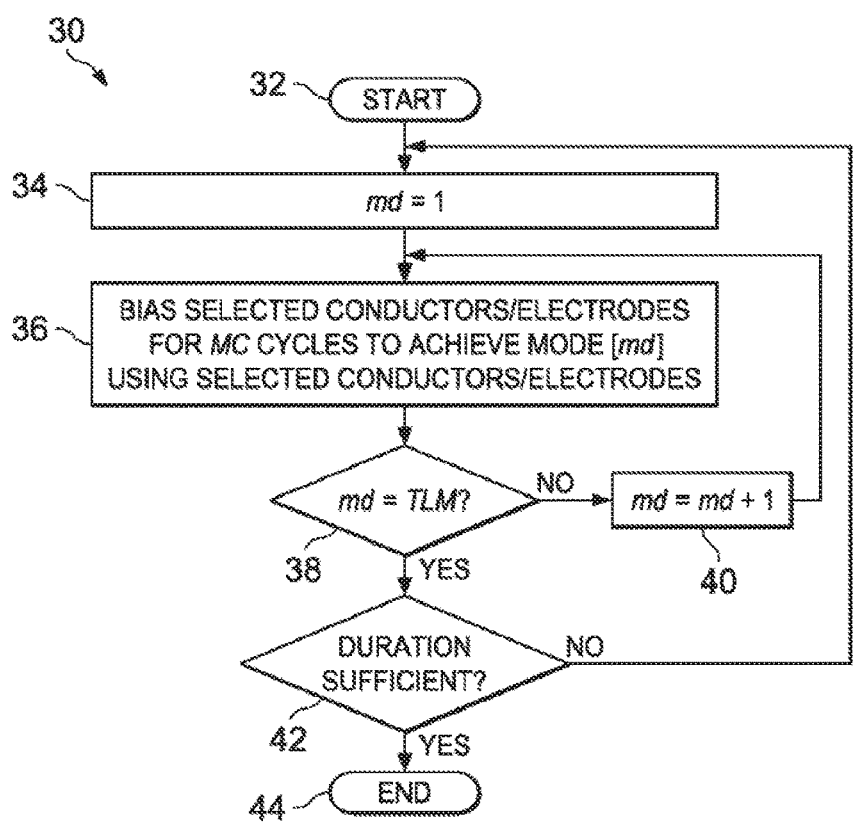
FIG. 17 illustrates a preferred embodiment method of operating the system of FIGS. 1A through 1C.

FIG. 17 illustrates a preferred embodiment method 30 of operating system 10. By way of introduction, method 30 may be controlled driver circuit $10_D$, which can include, or cooperate with, a processor, controller, or other circuit or device, as may be hardwired or programmed by concepts according to one skilled in the art, and an example of which is shown later in FIG. 18. As further introduction, such control advances method 30 so as to apply transducer voltages to selective ones (or all) of the conductors/electrodes of system 10, so as to alternate between different mode shapes created in lens cover 12, via standing and traveling waves applied to it from transducer 14. In combination, therefore, the standing and traveling waves increase the ability to accelerate the surface of lens cover 12 so as to achieve a desirably sufficient amount of acceleration coverage across a majority of the area of the cover. As a result, the accelerated movement of the lens cover increases the chances of dispelling portions of any contaminants along a majority of the area of the cover. Additional details follow.

Method 30 commences with a start step 32, which may be initiated by various apparatus or events, when it is desired to start an attempt to remove particulate from lens cover 12 by vibrating it via transducer 14. For example, where lens cover 12 is part of an automotive application as was introduced earlier and further explored later, start step 32 may be user actuated, such as by an operator of the automobile, or a processor can initiate the step in response to a condition, such as at system start-up, or after the passage of time, or response from a sensor or upon detection of some other event, such as rain, that might cause some matter (e.g., water) to come in contact with the exterior of lens cover 12. As another example, when lens cover 12 is part of a remote lens system (e.g., surveillance camera), step 22 may occur at some fixed time interval, or in response to signaling from another device, such as in response to environmental conditions or as part of an Internet-of-Things communication. In any event, once step 32 is enabled, method 30 has begun, after which method 30 continues from step 32 to step 34.

In step 34, a mode counter and is initialized to a value of one. As will become evident below, mode counter and increments, and thereby provides a count, up to a total number of modes TLM that are shaped onto lens cover 12, by transducer 14, in cyclic and alternating fashion, so as to attempt to remove contaminants from lens cover 12. Next, method 30 continues from step 34 to step 36.

In step 36, voltage is applied to a set of selective ones or all of the electrodes of transducer 14, via the respective conductors connected to those electrodes, so as to achieve a mode, indicated as MODE[md], meaning according to the index provided by counter md. Thus, for a first occurrence of step 36, a first mode (i.e., MODE[1]) is effected by applying the necessary voltage signals to a first set of electrodes so as to accomplish that mode. For example, consider the first mode to be the application of the mode (0,1) standing shape, discussed earlier in connection with FIGS. 2A, 3A, 2B, and 3B. To achieve this mode, all outer electrodes $SOE_x$, receive a voltage of a first sine wave, while all inner electrodes $SIE_x$ receive a voltage of a second sine wave of the same sample amplitude as the first sine wave, but with the two waves phase offset by 180 degrees; moreover, both sine waves are applied with a frequency $f_{m(0,1)}$, which is the resonant frequency of system 10 required to achieve the mode (0,1) shape. Note also that step 36 applies the signals to the selected set of conductor/electrodes for a number indicated as MC cycles, that is, for a duration of input sign waves equal to MC periods or cycles. The value of MC may be selected by various considerations. For example, MC may be based on a pre-programmed value or on a feedback signal (e.g., modal resonance frequency which will return to a baseline value as contaminant mass is ejected from the surface), or from information from a camera system from which it can be determined if a sufficiently clear image is obtained through the lens. After the MC cycles at the current MODE[md] have been achieved, method 30 continues from step 36 to step 38.

In step 38, a condition is evaluated to determine whether the mode counter and has reached a total number of modes TLM that are desired to be shaped onto lens cover 12, by transducer 14. If and is less than TLM, then method 30 advances from step 38 to step 40, whereas if and equals TLM, then method 30 advances from step 38 to step 42. In step 40, the mode counter and is incremented and the flow returns to step 36. In a repeat of step 36, therefore, an additional set of selective ones or all of the electrodes of transducer 14 receive a voltage so as to achieve a next mode, indicated as MODE[md], which in the case of a first repetition of step 26 will be the second mode, that is, MODE[2]; however, further in the preferred embodiment, the additional mode may be another instance of a standing wave, or alternatively it may be a traveling wave. For example, consider the second mode to be the application of the mode (1,1) traveling shape, discussed earlier in connection with FIGS. 10 through 14. To achieve this mode, recall that the signals from Table 1 may be applied, whereby four different phases, across 360 degrees, are applied equally spaced among the four different transducer segments. Again, step 36 applies these signals to the selected set of conductor/electrodes for MC cycles, after which method 30 again continues from step 36 to step 38.

Step 38 has been described earlier, as it evaluates the condition of whether the mode counter and has reached a total number of modes TLM that are desired to be shaped onto lens cover 12, by transducer 14. Given the sequencing now described, and the potential looping from step 38 not being satisfied and returning to step 36 one or more times for the application of respective additional modes, note that TLM may be set to any number with a corresponding indication of each MODE[md] to be applied for each incidence of step 36, until the condition of step 38 is satisfied and method 30 continues to step 42.

In step 42, a condition is evaluated to determine whether a sufficient duration of cycles has been applied by the preceding occurrence(s) of step 36. To appreciate this step, recall that each incidence of step 36 excites transducer 14 to apply either a standing or traveling wave mode shape to lens cover 12, for a total of MC cycles per step 36 incidence. Each of these MC cycles, therefore, endeavors to clear contaminants from the surface of lens cover 12. Depending on the number of cycles per step 36 incidence, and the number of step 36 occurrences, it may be desirable to repeat the occurrence(s) of step 36 for all TLM modes MODE[md] one or more additional times, in an ongoing effort to clear contaminants from the surface of lens cover 12. Thus, the step 42 condition may use duration (or some other measure) as a basis to evaluate whether to repeat the occurrence(s) of step 36 for all modes MODE[md]. If such a repetition is desired, method 30 returns from step 42 to step 34, whereas if step 42 is satisfied, then method 30 ends in step 44. While method 30, therefore, concludes with step 44, it may be subsequently re-started by returning to step 32, by one of the actions as mentioned earlier with respect to that step.

Given the preceding, one skilled in the art will appreciate that in each of the multiple different modes, one area of lens cover 12 will achieve a maximum or peak acceleration, while various other areas of the lens cover will achieve some lesser percentage of that peak. In an effort to achieve the greatest likelihood of dispelling contaminants, therefore, a greater percentage of peak acceleration across a greater area of lens cover 12 is likely to be desirable. Thus, one criterion to evaluate the cleaning performance is to check the acceleration distribution values on the lens surface. The acceleration values on the lens surface can be calculated through Finite Element Modeling (FEM) simulation or through measurements from Laser Doppler Vibrometer (LDV). The obtained values can then be compared against a prescribed threshold, e.g., 50% of the peak acceleration value, to determine the lens area that exceeds the threshold. The area above the chosen threshold will be referred to as 'active area.' The active area achieved by different excitation methods can be compared, as is shown in Table 2, which is compares the active area achieved by (0,1) standing wave, (1,1) traveling wave, and the combination of the two based on FEM simulation. To simplify the comparison, the values of the active area as a percentage of the total area are listed. Note that the peak value used to calculate the threshold is the largest value that can be obtained by (0,1) standing wave and (1,1) traveling wave (and in this example, the largest value is achieved by (0,1) standing wave).

TABLE 2

| Threshold (% of peak value) | Lens area exceeds threshold (% of lens area) | | |
| --- | --- | --- | --- |
| | [0, 1] mode standing wave | [1, 1] mode traveling wave | [0, 1] standing and [1, 1] traveling wave combined |
| 25% | 55.0% | 81.3% | 84.0% |
| 50% | 2.6% | 30.8% | 30.9% |

TABLE 2-continued

| Threshold (% of peak value) | Lens area exceeds threshold (% of lens area) | | |
| --- | --- | --- | --- |
| | [0, 1] mode standing wave | [1, 1] mode traveling wave | [0, 1] standing and [1, 1] traveling wave combined |
| 75% | 1.1% | 6.0% | 6.7% |
| 90% | 0.5% | 0% | 0.5% |

From Table 2, one skilled in the art will appreciate that on average the traveling wave yields larger active area. However, the largest acceleration value (found in the center of lens 12) comes from the standing wave excitation. The combination of both excitations yields better coverage of both center and off-center lens area.

Figure 18:
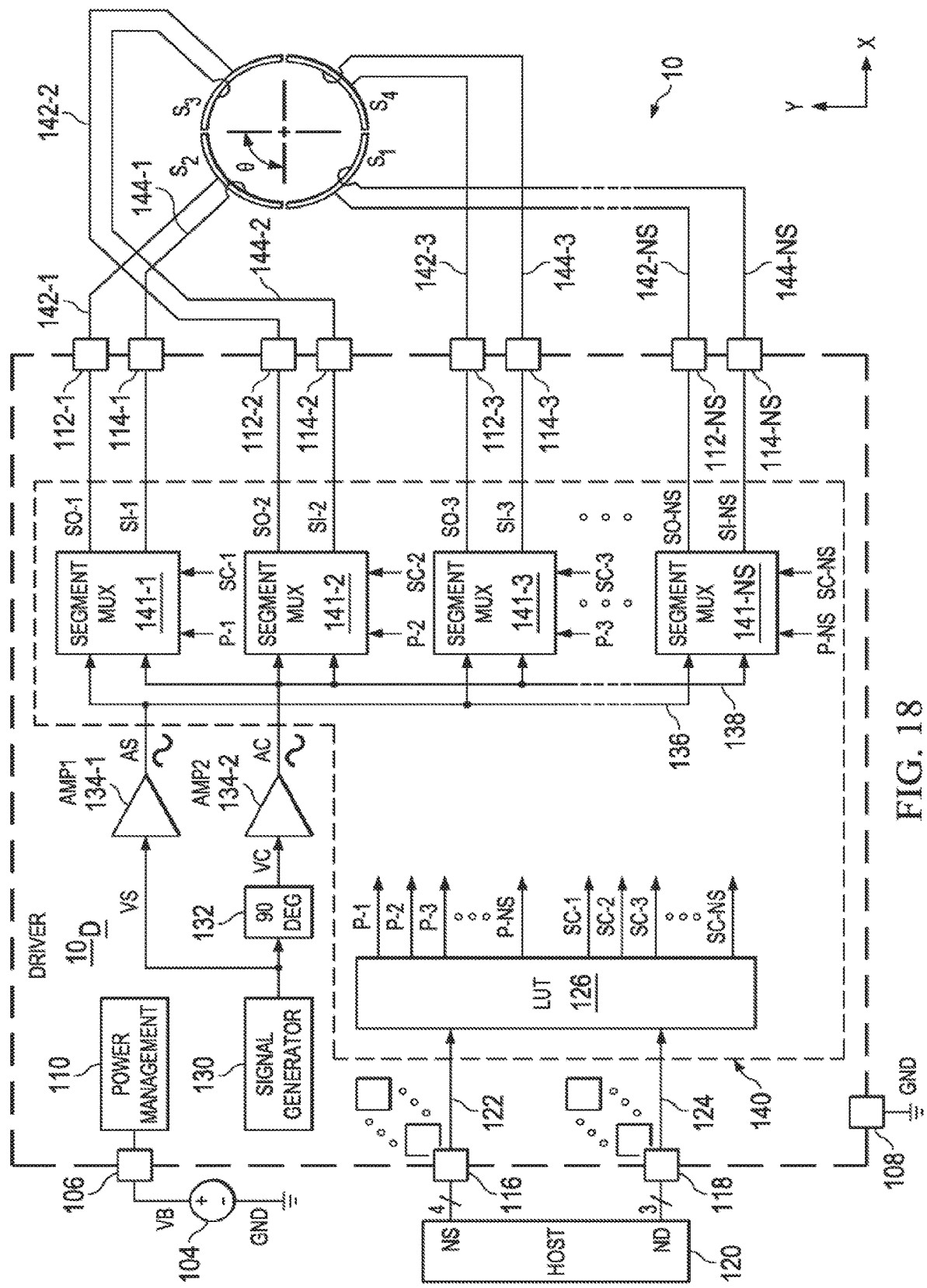
FIG. 18 illustrates a schematic of an ultrasonic lens cleaning system including a four-segment transducer arrangement and a driver IC to provide phase transducer signals to generate either or both a standing and traveling wave to a lens.

FIG. 18 illustrates ultrasonic lens cleaning system 10 in greater detail, including driver circuit (e.g., integrated circuit) $10_D$ and an even number NS of transducer segments, where in the example illustrates NS=4, thereby providing segments $S_1$ through $S_4$ to clean a lens 12. The illustrated embodiments include an even number NS transducer segments or elements that are mechanically coupled, directly or indirectly, to the lens 12, where NS is an even integer greater than or equal to 4. The individual transducer segments $S_x$ in this example are radially spaced from a center axis $12_{AX}$ of the circular lens 12 and the electrodes (see, e.g., FIG. 1B) are angularly spaced from one another around a periphery of the lens 12. As detailed further below, driver circuit $10_D$ provides phase shifted oscillating signals AS and AC to the electrodes of the transducer segments $S_x$ to generate a standing or mechanical traveling wave to vibrate the lens 12 for improved ultrasonic cleaning. The disclosed driver circuit $10_D$, system 10, and methods provide improved lens cleaning solutions.

Driver circuit $10_D$ in this example is a driver integrated circuit powered by a battery or other power source 104. FIG. 18 shows a camera lens assembly including the ultrasonic lens cleaning system 10. The lens assembly includes the transducer segments $S_1$ through $S_4$ forming a cylindrical or "ring" configuration which is mechanically coupled to vibrate a lens 12. Lens 12 may be as shown in FIGS. 1A-1C, or may have other shapes or configurations (e.g., fisheye, single transparent surface, and the like).

Driver circuit $10_D$ receives input power from a power supply or power source 104, such as a battery providing a battery voltage signal VB with respect to a reference node, such as a ground node GND in one example. Driver circuit $10_D$ includes a terminal 106 (e.g., an IC pin or pad) to receive the battery voltage signal VB from the power supply 104, as well as a ground terminal 108 for connection to GND. Driver circuit $10_D$ includes a power management circuit 110 that receives the battery voltage signal VB and provides one or more supply voltages (not shown) to power the internal circuitry of driver circuit $10_D$. In addition, driver circuit $10_D$ includes terminals 112-1, 112-2, 112-3, ..., 112-NS and 114-1, 114-2, 114-3, ..., 114-NS for connection of multiplexer signal outputs to the lead wires 142-1, 142-2, 142-3, ..., 142-NS and 144-1, 144-2, 144-3, ..., 144-NS to deliver driver signals to the transducer segments 102.

Driver circuit $10_D$ provides a set of phase shifted oscillating signals to cause the transducer segments to vibrate lens 12 to facilitate or promote cleaning of the lens 12 through provision of mechanical traveling waves that rotate around the lens axis $12_{AX}$. In one example, driver circuit $10_D$ provides phase shifted sinusoidal ultrasonic drive signals to actuate the transducer segments and cause transducer 14 to mechanically vibrate lens 12 using ultrasonic waves to remove dirt and/or water from the surface of lens 12. Non-sinusoidal oscillating signals can be provided, for example, square waves, pulse-width modulated waveforms, triangular waveforms or other waveform shapes. Mechanical oscillation or motion of lens 12 at ultrasonic waves of a frequency at or close to the system resonant frequencies can facilitate energy efficient removal of water, dirt and/or debris from lens 12. In one example, driver circuit $10_D$ delivers phase shifted oscillating drive signals to the transducer segments at or near a resonant frequency of the mechanical assembly. A fixed driver signal frequency can be used, or the frequency may be adapted by driver circuit $10_D$ to accommodate changes over time or different frequencies can be used for cleaning different types of debris from lens 12. Driver circuit $10_D$ in one example tracks changes in the resonant mechanical frequency of an associated lens system, and provides a closed loop system to use this information to maintain cleaning performance over time and in varying environmental conditions.

Driver circuit $10_D$ includes a signal generator 130 and a phase shift circuit 132, along with first and second amplifiers 134-1 (AMP 1) and 134-2 (AMP 2) to generate and provide phase shifted oscillating signals AS and AC to the transducer segments to generate a standing wave across, or a mechanical traveling wave rotating around the center axis $12_{AX}$ of, the lens 12. Any suitable amplifier circuitry 134 can be used, for example, a power op amp circuit designed to accommodate the frequency bandwidth of the signals VS provided by the signal generator 130 and the output signal requirements to properly drive a given transducer segment. The signal generator circuit 130 generates a first output signal VS that oscillates at a non-zero frequency ω. In some examples, the frequency ω is ultrasonic, such as about 20 kHz or more, although not a strict requirement of all implementations of the presently disclosed examples. In certain examples, the signal generator 130 is an analog circuit capable of providing an oscillating output signal VS of any suitable waveform shape in a range of frequencies, for example from 1 kHz through 3 MHz, and can provide the signal VS that concurrently includes multiple frequency components in order to excite the driven transducers at multiple frequencies concurrently. In one example, the signal generator circuit 130 is a pulse width modulated circuit to provide a square wave output signal voltage waveform VS. In other examples, the signal generator 116 provides sinusoidal output voltage signals. In other examples, triangle, saw tooth, or other wave shapes or combinations thereof can be provided by the signal generator 130.

The phase shift circuit 132 receives the first output signal VS and generates a second output signal VC that oscillates at the non-zero frequency ω. The second output signal VC is phase shifted from the first output signal VS by a non-zero angle. In one example, the signal generator circuit 130 generates a sinusoidal first output signal VS represented as VS=K*sin(ωt) and the phase shift circuit 132 provides the second output signal VC=K*cos(ωt) shifted by 90 degrees from the first output signal VS. The first amplifier 134-1 includes an input to receive the first output signal VS, and a first amplifier output 136 to generate a first amplified signal AS based on the first output signal VS. The second amplifier 134-2 includes an input to receive the second output signal VC, and a second amplifier output 138 to generate a second amplified signal AC based on the first output signal VC.

Driver circuit $10_D$ interfaces with the transducer segments by connection to the IC terminals grouped as driver signal output terminal pairs 112, 114 individually associated with a corresponding one of the transducer segments 102. The individual driver signal output terminal pairs include a first output terminal 112 that can be coupled to a first side conductor (e.g., outer side) of a corresponding transducer segment, and a second output terminal 114 that can be coupled to a second side conductor (e.g., inner side) of the corresponding transducer segment. Driver circuit $10_D$ may include extra output terminal pairs 112 and 114 to allow configuration of the IC to drive different numbers of transducer segments 102 for different applications, such as NS=2, 4, 8, 16, etc. Driver circuit $10_D$ also includes a routing circuit 140 that delivers the first amplified signal AS to a first set of the output terminals 112, 114 and delivers the second amplified signal AC to a second set of the output terminals 112, 114 to generate standing wave or a mechanical traveling wave to vibrate lens 12.

The routing circuit 140 can be a fixed interconnection system to route the signals AS and AC to specific output terminals 112, 114. In other examples, a configurable routing circuit 140 can be used to allow reconfiguration of driver circuit $10_D$ for different applications. In the example of FIG. 18, the routing circuit 140 includes an integer number NS multiplexers 141-1, 141-2, 141-3, . . . , 141-NS. The individual multiplexers 141 corresponding to one of the transducer segments. The individual multiplexers 141 in various examples include two or more multiplexer inputs. In the example of FIG. 18, a first multiplexer input of the individual multiplexers 141 is coupled with the first amplifier output 136 to receive the signal AS, and a second multiplexer input is coupled with the second amplifier output 136 to receive the second amplified signal AC. The individual multiplexers 141 have first and second outputs, including a first multiplexer output 142 coupled to deliver a first multiplexer output signal SO to a first conductor (e.g., outer) side of the corresponding transducer segment 102. A second multiplexer output 144 is coupled to deliver a second multiplexer output signal SI to a second conductor (e.g., inner) side of the corresponding transducer segment. The multiplexers 141-1 through 141-NS provide corresponding outer and inner signals SO-1, SO-2, SO-3, . . . , SO-NS and SI-1, SI-2, SI-3, . . . , SI-NS to the respective transducer segments 102-1, 102-2, 102-3, . . . , 102-NS as shown in FIG. 18.

A select input of the individual multiplexers 141 receives a select signal to select among the inputs. In FIG. 18, two select inputs receive select signals P and SC, respectively. In this example, the P input signals P-1, P-2, P-3, . . . , P-NS are used to select a polarity for the corresponding transducer segment and the SC inputs SC-1, SC-2, SC-3, . . . , SC-NS select between the amplified sine signal AS and the phase shifted, amplified cosine signal AC. The individual multiplexers 141 operate according to the corresponding received select signals P and SC to provide a selected oscillating signal AS or AC to one of the inner and outer conductors of the corresponding transducer segments. The other conductor of the associated transducer segment may be coupled to a reference voltage, such as the constant voltage signal GND, or to the other oscillating signal.

The routing circuit 140 in FIG. 18 includes a lookup table 126 (LUT) to provide the select signals P and SC to the multiplexers 141 according to one or more configuration inputs. In certain examples, driver circuit $10_D$ includes at least one configuration input terminal 116, 118 to allow configuration by an external circuit, such as a host circuit 120. Driver circuit $10_D$ includes four terminals 116 to receive a binary coded input NS to specify the number of output multiplexers to be used to drive NS transducer segments. Three input terminals 118 are provided to receive a binary coded ND signal designating the number of nodal diameters for the resulting traveling wave. The NS inputs provide the NS signal via lines 122 to the lookup table 126, and the ND inputs provide the ND signal via lines 124 to the lookup table 126.

The LUT 126 in one example is encoded to provide the P and SC signals to configure the multiplexers 140 according to the host-specified NS and ND values to operate the transducer segments to generate a standing or traveling wave to clean lens 12. The multiplexers 141 in FIG. 18 allow selection from the sine wave AS or the cosine wave AC based on the P and SC signals from the lookup table 126. In other examples, the individual multiplexers 141 include a third multiplexer input coupled with a reference voltage, such as GND. This configuration allows selective interconnection of specific ones of the outer and/or inner conductors with the amplified sinewave signal AS, the amplified cosine signal AC or the reference voltage GND according to the P and SC signals to establish a mechanical traveling wave excitation of lens 12. In this regard, driver circuit $10_D$ is configurable by the host circuit 120 to implement a variety of different configurations based on the number of transducer segments (NS) and the number of nodal diameters (ND). The configuration of the multiplexers 141 provides the polarity and the selection of sine or cosine waveforms for the electrode or electrical connection of each side of the transducer segments. In the case of piezoelectric transducer segments, the segments vibrate when a periodic electrical signal is applied, in order to separate debris from the mechanically coupled lens 12. The entire lens assembly will typically have one or more resonant frequencies determined by the mechanical properties of all the components and the boundary conditions, and the signal generator circuit 130 in certain examples provides the sinewave VS at a frequency co at or near one of the resonant points for effective, efficient cleaning.

In one example, the lookup table 126 provides the multiplexer select signals to configure the polarity (P) and sine/cosine signal (SC) provided by the individual multiplexers 141. The following Table 3 shows an example of these control signals, where AS and AC are sine and cosine amplitude inputs, P and SC are control signal bits. SO and SI are inner and output signal outputs from the multiplexers 141, which are determined by the traveling wave pattern to be excited for lens cleaning. This example can be used for a four-segment system such as those described herein.

TABLE 3

| P | SC | SO | SI |
|---|----|----|----|
| 0 | 0  | AS | GND |
| 1 | 0  | GND | AS |
| 0 | 1  | AC | GND |
| 1 | 1  | GND | AC |

One example of the contents of the lookup table 126 is shown in Table 4 for a 16-segment system, where NS represents the number of segments and ND represents the number of nodal diameters.

TABLE 4

| NS | ND | P | SC |
|----|----|---|-----|
| 16 | 1 | 0000 0000 1111 1111 | 1111 0000 1111 0000 |
| 16 | 2 | 0000 1111 0000 1111 | 0011 0011 0011 0011 |
| 16 | 4 | 0011 0011 0011 0011 | 0101 0101 0101 0101 |

Figure 19:
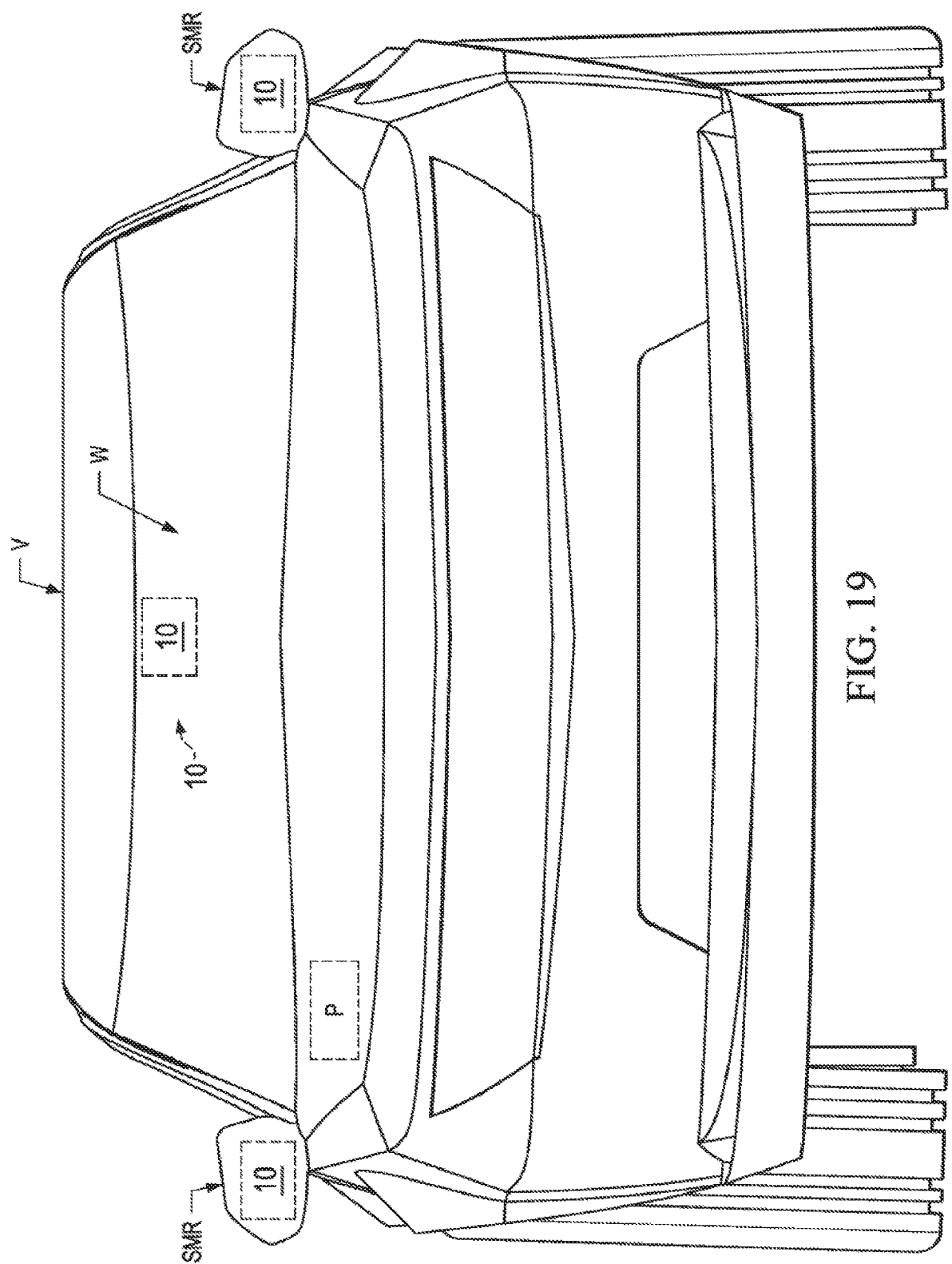
FIG. 19 illustrates a preferred embodiment vehicle V with multiple implementations of the system of FIGS. 1A through 1C.

FIG. 19 illustrates a preferred embodiment vehicle V with system 10 implemented in numerous locations relative to the vehicle V. For example, a forward facing camera may be installed as part of a system 10 in a mount located behind the windshield W of vehicle V. As another example, a respective rearward facing camera may be installed as part of a system 10 in each of the vehicle side mirror locations SMR, either in addition to or in lieu of an actual side mirror. As a final example, another rearward facing camera may be installed near or at the rear of the vehicle V, so as to assist with backup technology. Each system 10 communicates with a processor P, such as a controller, microcontroller, or the like, located either under the hood or inside the interior of the vehicle, where such communication as may be connected by some type of conductors, including a vehicle network system. In any event, each system 10 is operable to capture light signals as images, for various types of processing and/or display. Moreover, as described above, each such camera has a lens structure (e.g., lens, lens cover), and associated therewith is a transducer that is operable according to method 20 so as to reduce any contaminants on the surface of the lens structure.

From the above, the preferred embodiments are shown to provide an ultrasound lens structure cleaner and architecture method, either as a standalone unit or as part of a larger preferred embodiment system (e.g., a vehicle; surveillance camera; lighting system). Such preferred embodiments provide numerous benefits. For example, greater vibration coverage of the lens structure surface is achieved with a combination of waves providing both high transverse amplitudes and rotational patterns. As another example, greater acceleration coverage is achieved of the lens structure surface. As still another example, note that strains may be developed in multiple directions, rather than just the axial direction, to promote cracking of dried materials. More particularly, besides high transverse acceleration (orthogonal to the surface), lateral strain can be developed, which may be important for cracking dried contaminants Thus, strain may be imposed on the lens surface in both the radial and tangential directions. Thus, whereas due to the circular nature of the mode shape, strain is only applied in the radial but not in the tangential direction, the preferred embodiment may apply strain additionally in the tangential direction, whereby contaminants can be even more effectively removed. Moreover, asymmetric modes (e.g., mode (1,1) shape) will apply strain in both directions, leading to more effective cracking. As still another benefit, a straightforward driver circuit may drive system 10. Still further, the preferred embodiments are implemented without vibration or resonance frequency matching issues. In view of the above, therefore, the inventive scope is far reaching, and while various alternatives have been provided according to the disclosed embodiments, still others are contemplated and yet others can ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A lens structure system, comprising:
   a lens structure comprises a lens cover comprising an outer ring and a central portion transparent to light;
   a multi-segmented transducer coupled to the lens structure and comprising a plurality of segments, the multi-segmented transducer comprising a single body of piezoelectric material having a central opening and having an upper annular surface, wherein the outer ring of the lens cover is mechanically attached to the upper annular surface of the multi-segmented transducer and an outer diameter of the lens cover extends beyond an outer diameter of the multi-segmented transducer and each segment in the plurality of segments includes a portion of the transducer; and
   driver circuitry comprising:
      a first amplifier coupled to a signal generator;
      a second amplifier coupled to a phase shift circuit; and
      a plurality of segment multiplexers, each coupled to the first amplifier and the second amplifier, each coupled to one of the plurality of segments of the multi-segmented transducer.

2. The system of claim 1 wherein the phase shift circuit is coupled to the signal generator.

3. The system of claim 1 wherein the driver circuitry further comprises a routing circuit coupled to each of the segment multiplexers.

4. The system of claim 3, wherein the routing circuit further comprises a lookup table coupled to each of the segment multiplexers.

5. The system of claim 4 wherein the lookup table is configured to store multiplexer select signals to configure polarity and sine/cosine provided by the plurality of multiplexers.

6. The system of claim 3 wherein the routing circuit is coupled to a host circuit, the host circuit configured to send a signal to the routing circuit for operation of the plurality of segments of the multi-segmented transducer.

7. The system of claim 3 wherein the routing circuit is reconfigurable.

8. The system of claim 1 wherein the lens structure comprises a camera lens.

9. The system of claim 1 wherein the plurality of segments comprises four segments.

10. The system of claim 1 wherein the lens structure comprises a circular lens structure.

11. The system of claim 1 wherein each of the plurality of segments comprises an outer electrode and an inner electrode.

12. The system of claim 11, wherein each of the plurality of segment multiplexers is coupled to the respective outer electrode and the respective inner electrode.

13. The system of claim 1 and further comprising a camera adjacent the lens structure.

14. The system of claim 1, wherein the driver circuitry further comprises terminals for coupling the plurality of multiplexers to the plurality of segments of the multi-segmented transducer.

15. The system of claim 14 wherein a first segment in the multi-segmented transducer is adjacent a second segment in the multi-segmented transducer.

16. The system of claim 1:
   wherein a first segment in the multi-segmented transducer comprises a material having first polling in a first direction; and
   wherein a second segment in the multi-segmented transducer comprises a material having second polling in a second direction opposite the first direction.

17. A camera assembly, comprising:
   a camera;
   a lens structure adjacent the camera and comprising a lens cover, the lens cover comprising an outer ring and a central portion that is transparent to light;
   a multi-segmented transducer coupled to the lens structure and comprising a plurality of segments, the multi-segmented transducer comprising a single body of piezoelectric material with a central opening and having an upper annular surface, the lens cover mechanically attached to the upper annular surface of the transducer wherein an outer diameter of the lens cover extends beyond an outer diameter of the multi-segmented transducer and each segment in the plurality of segments includes a portion of the single body of the transducer; and
   a plurality of segment multiplexers, each coupled to one of the plurality of segments of the multi-segmented transducer, each coupled to a first amplifier path and a second amplifier path.

18. The camera assembly of claim 17, wherein the first amplifier path comprises a first amplifier and the second amplifier path comprises a second amplifier and a phase shift circuit.

19. The camera assembly of claim 17, further comprising a lookup table coupled to each of the plurality of segment multiplexers.

\* \* \* \* \*